United States Patent
Ma et al.

(10) Patent No.: US 8,284,990 B2
(45) Date of Patent: Oct. 9, 2012

(54) SOCIAL NETWORK CONSTRUCTION BASED ON DATA ASSOCIATION

(75) Inventors: Yunqian Ma, Plymouth, MN (US); Kirk Schloegel, Golden Valley, MN (US); Roland Miezianko, Plymouth, MN (US); Petr Cisar, Suchdol nad Luznici (CZ)

(73) Assignee: Honeywell International Inc., Morristown, NJ (US)

( * ) Notice: Subject to any disclaimer, the term of this patent is extended or adjusted under 35 U.S.C. 154(b) by 859 days.

(21) Appl. No.: 12/369,692

(22) Filed: Feb. 11, 2009

(65) Prior Publication Data

US 2009/0292549 A1 Nov. 26, 2009

Related U.S. Application Data

(63) Continuation-in-part of application No. 12/124,293, filed on May 21, 2008, and a continuation-in-part of application No. 12/187,991, filed on Aug. 7, 2008.

(51) Int. Cl.
*G06K 9/00* (2006.01)
(52) U.S. Cl. .................................. 382/103; 348/169
(58) Field of Classification Search .................. 382/100, 382/103, 181, 190, 195; 348/135, 143, 169–172
See application file for complete search history.

(56) References Cited

U.S. PATENT DOCUMENTS

| | | | |
|---|---|---|---|
| 7,016,307 B2 | 3/2006 | Vasudev et al. | |
| 7,249,123 B2 | 7/2007 | Elder et al. | |
| 7,366,759 B2 | 4/2008 | Trevithick et al. | |
| 7,558,404 B2 * | 7/2009 | Ma et al. | 382/103 |
| 7,596,241 B2 * | 9/2009 | Rittscher et al. | 382/103 |
| 7,796,029 B2 * | 9/2010 | Ma et al. | 340/539.25 |
| 7,881,505 B2 * | 2/2011 | Schneiderman et al. | 382/118 |
| 8,085,302 B2 * | 12/2011 | Zhang et al. | 348/169 |
| 2003/0107649 A1 * | 6/2003 | Flickner et al. | 348/150 |

OTHER PUBLICATIONS

Hanneman et al., "Introduction to Social Network Methods," Online at http://faculty.ucr.ed/-hanneman/nettext/, 296 pages, printed Apr. 4, 2008.
Karypis et al., "Multilevel Algorithms for Multi-Constraint Graph Partitioning," 25 pages, May 5, 1998.
Schloegel et al., "A New Algorithm for Multi-Objective Graph Partitioning," 10 pages, Sep. 20, 1999.

* cited by examiner

*Primary Examiner* — Anand Bhatnagar
(74) *Attorney, Agent, or Firm* — Seager Tufte & Wickhem LLC.

(57) ABSTRACT

A system for social network construction. Video analytics and association may be used to develop a social network. Also, social groups may be developed from temporal proximity of persons. In the case of several social networks, they may be collapsed into one network or a weighted graph that mining algorithms can handle.

20 Claims, 27 Drawing Sheets

|     | $E_1$ | $E_2$ | $E_3$ |   |   |   | $E_m$ |
|-----|-------|-------|-------|---|---|---|-------|
| $P_1$ | $P_{1,1}$ | $P_{2,1}$ | $P_{3,1}$ | 1 | 1 | 0 | $P_{m,1}$ |
| $P_2$ | $P_{2,1}$ | $P_{2,2}$ | $P_{3,2}$ | 0 | 0 | 1 | $P_{m,2}$ |
| $P_3$ | $P_{3,1}$ | $P_{3,2}$ | $P_{3,3}$ | 0 | 0 | 0 | 0 |
| $P_4$ | --- | 0 | 0 | 1 | 1 | 0 | 0 |
| $P_{---}$ | --- | 0 | 0 | 0 | 0 | 0 | 1 |
| $P_n$ | $P_{n,1}$ | $P_{n,2}$ | $P_{n,3}$ | 0 | 0 | 1 | $P_{m,1}$ |

*Figure 12A*

|     | $P_1$ | $P_2$ | $P_3$ | $P_4$ | $P_{--}$ | $P_n$ |
|-----|-------|-------|-------|-------|----------|-------|
| $P_1$ | 0 | $PP_{1,2}$ |   |   |   |   |
| $P_2$ | $PP_{2,1}$ | 0 |   |   |   |   |
| $P_3$ |   |   | 0 |   |   |   |
| $P_4$ |   |   |   | 0 |   | $PP_{4,n}$ |
| $P_{--}$ |   |   |   |   | 0 |   |
| $P_n$ |   |   |   | $PP_{n,4}$ |   | 0 |

*Figure 12B*

SOCIAL NETWORK CONSTRUCTION BASED ON DATA ASSOCIATION

The present application is a Continuation-in-Part of U.S. patent application Ser. No. 12/124,293, filed May 21, 2008. The present application is a Continuation-in-Part of U.S. patent application Ser. No. 12/187,991, filed Aug. 7, 2008. U.S. patent application Ser. No. 12/124,293, filed May 21, 2008 is hereby incorporated by reference. U.S. patent application Ser. No. 12/187,991, filed Aug. 7, 2008 is hereby incorporated by reference.

BACKGROUND

The invention pertains to observations at facilities, and particularly to video surveillance that may be relevant to security operations and other purposes.

SUMMARY

The invention may be a system having architecture for constructing a dynamic social network from raw video data of observations of people, objects and/or events. Also, there may be social groups discovered from temporal proximity of persons.

BRIEF DESCRIPTION OF THE DRAWING

FIG. 12a shows a table of a people-events matrix;

FIG. 12b shows a table of a people-people matrix;

DESCRIPTION

A system may involve building a dynamic social network (DSN) from image data. The system may provide social network refinement based on feedback from data association. An ever-present use of video sensors for monitoring may have transformed security operations at large facilities such as airports and critical infrastructures. Solutions enabling monitoring simple activities appear to be currently deployed in a large number of facilities. Some operators may have come to rely on such tools for their daily security operations. While these solutions and tools may achieve basic functions, they seem unable to detect activities of interest related to security threats. Additionally, they appear to lack a social network development capability relative to image data such as surveillance video.

Figure 1:
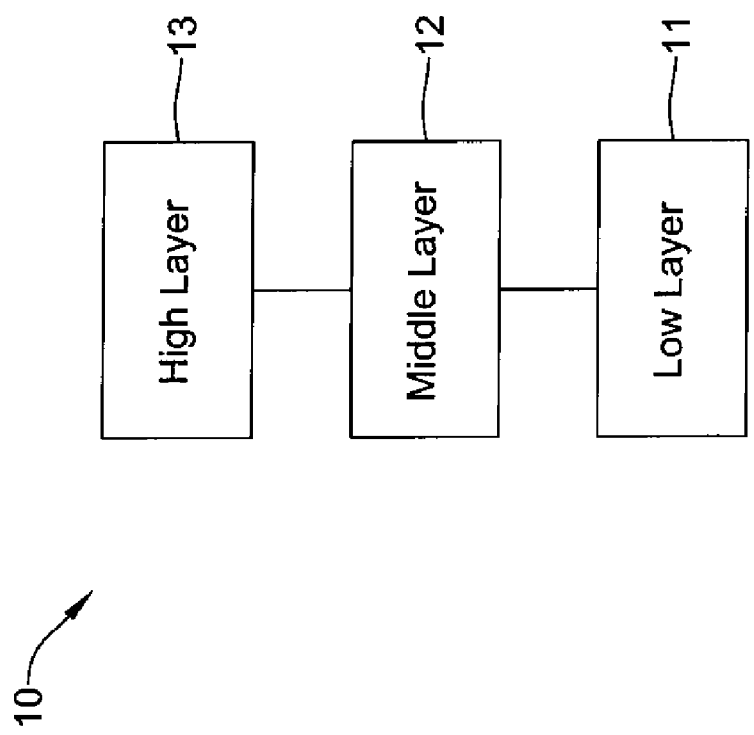
FIG. 1 is a diagram of an example of a layered architecture of a system for constructing a social network.

The system includes an approach for constructing a dynamic social network from image data. In FIG. 1, a system 10 having a layered architecture may be used for constructing the dynamic social network. The architecture may be structured with three or so layers. However, depending on the design, the architecture may have more or less than three layers. The illustrative example may have three layers. First, a low layer 11 may include obtaining raw image data from the various sensors around a facility or the like under observation. This layer may include attaining video analytics results of actor-event involvement as drawn from the data. Such involvement may be put into a form of a raw matrix which may include such items as actor IDs, event IDs, one or more camera numbers, timestamps, location, associations between actors, and so forth. An actor may be a person or an object. A middle layer 12 may follow layer 11 and a high layer 13 may follow layer 12.

Second, a middle layer 12 may include an actor-event two-dimensional matrix. It may be a two-mode sociomatrix, where rows index actors and columns index events. For instance, if there are n actors and m events, then the two-dimension matrix may be an "n×m" matrix. An (i,j) cell of the matrix may be 1 if row actor i is involved with event j. Otherwise, the entry may be 0 if row actor i is not involved with event j. The row margin totals may indicate the number of events with which each actor is involved.

Third, a high layer 13 may include a social network of actors and relationships. Actors and nodes may be regarded as equivalent terms. Relationships, edges and links may be regarded as equivalent terms. The term "some" may mean "at least one". A relationship may result from, be indicated by, inferred from, or described by an event among the actors. For each relationship, link or edge, a weight may be assigned. The greater the weight, the tighter is the relationship. The weight may have correspondence to an importance factor of a respective event.

The low, middle and high layers may be regarded as first, second and third layers, respectively, or vice versa. The three, more or less, layers may be labeled with other terms as may appear fitting.

Events may often involve two or more actors. Relative to the architecture of the system, a relationship of the two or more actors indicated at the high layer may be inferred from the actor-event matrix of the middle layer. The events may build a linkage among the actors. The events may be co-location, co-temporal, and/or other.

In proceeding from the middle layer 12 to the high layer 13, an importance factor may be determined for each event. A weighted frequency may be calculated for the relationship between two actors in the high layer. A basic frequency may be proportional to the number of times that two actors have a one (1) in the same columns of a table or matrix. The weighted frequency may be the basic frequency multiplied by an importance factor or weight of a relevant event. Attendance at some of the events may have a magnitude of importance which may be referred to as a "weight".

In other words, the basic frequency may be a number of times that actors have been present at one or more of the same events. The weighted frequency of the relationship between the actors may be a product of the basic frequency and the weight assigned to the respective same event. The total of the weights assigned to all of the events of an actor-event matrix should be about one (1).

In sum, a dynamic social network may eventually be built from raw images or video with an approach that proceeds through the low layer 11, the middle layer 12 and the high layer 13, respectively, in the system 10. With a sliding window in time, to reach back for information that has passed, the social network may be dynamic. Also, in that information is incomplete or updatable at a certain point in time, with the system 10 in an on-line situation, data may continuously flow to the low layer for processing which may complete and/or update information already in the system, or bring in new information thus also resulting in the social network being dynamic.

Video or surveillance data may be extracted from the raw images or video at the low layer 11. The low layer may also handle image or video data for purposes of extracting and determining actors and events. A network of cameras may be used for collecting the data. For the same camera, or several cameras with overlapping fields of view, one may perform motion tracking of an association of an actor or actors. For different cameras, particularly with non-overlapping fields of view, there may be an identification (ID) association of an actor or actors between multiple cameras. The ID association may include face association, actor association, and/or biometrics association, such as standoff iris recognition. An association could instead be identification. Algorithms may be used for detecting and matching actors, faces, other biometrics, and more, especially with respect to identifying actors from one camera to another camera, actors at events, and actors associating and/or meeting with each or one another. Also, algorithms may be used to identify and/or associate events. The algorithms may be part of the video analytics at the low layer 11.

The events under consideration may be co-spatial events and/or co-temporal events. For example, a co-spatial event may involve an object, such as luggage, abandoned by one actor and picked up by another actor. The luggage and persons may be regarded as actors, i.e., object and persons. The abandonment and picking up of the luggage may be regarded as one or two events to be analyzed. The event may be attended by both actors but not necessarily at the same time and thus be regarded as co-spatial. If both actors are aware of each other's actions, they may be considered as attending one and the same event. If that is not the case, for example, the first actor leaves or abandons luggage in an airport, intentionally or unintentionally, and the second actor, such as security guard, picks up the luggage for safety reasons and has little or no knowledge about the first actor, and that the picking up is not a planned or coordinated act relative to the first actor, then both actions regarded as two events. The luggage itself may be regarded as an actor. If both actors were playing a role relative the abandoning and pick-up of the luggage, then these actions may be considered as attending one event. This event appears to be of interest, especially in an airport setting, and may have a particular significant importance. In another setting, the event may be considered as having insignificant importance.

The video analytics of the low layer analysis may extract the events, determine who the actors are, and check features and match features of the actors. Numerous actors may be noted. There may be a meeting, i.e., an event, between two actors indicating a spatial-temporal co-location, that is, two actors being simultaneously at the same location for the event. However, in some situations, an event may be just co-spatial or co-temporal. The actors and events may be extracted from the video data at the low layer. Such data may be reduced to an actor-event matrix at the middle layer 12. Attending an event, such as a meeting, may be regarded as a logic function "AND" in the grid, table or matrix. For example, two actors relative to an event may be indicated by a one or zero unit in the respective box of a matrix which may be at the middle layer 12.

There may be a spatial-temporal frequency. For instance, actors meeting five times within one week may establish a link. The link may be regarded as weak, moderate or strong. One meeting time between actors may be regarded and a weak or no link. The link may be from an event. Each event may have a weight. The weights of events may vary. An important event may have a significant weight. The abandoning of a piece of luggage at an airport may be an important event having a significant weight. If an event has no importance, it may have a weight of zero, and there may be no result of connection, relationship, edge or link between or among the actors of concern.

There may be a table or matrix where a transition may be made from the middle layer 12 to the high layer 13 of architecture or system 10. However, the matrix is another step towards information to provide a basis for constructing the social network. Events may have importance factors. Consequently, weights may be assigned to links. There may be a threshold value (T) of a weight for a link to be recognized. The value may be designated to be equal to or greater than some selected number. Weights of links may be used to derive a social network. The weights of the links between or among actors may provide the basis for the social network of the actors at the high layer 13 of the system 10 architecture. Link weights for several actors may be derived from the event weights which in turn can be derived from importance factors of the events.

Figure 2:
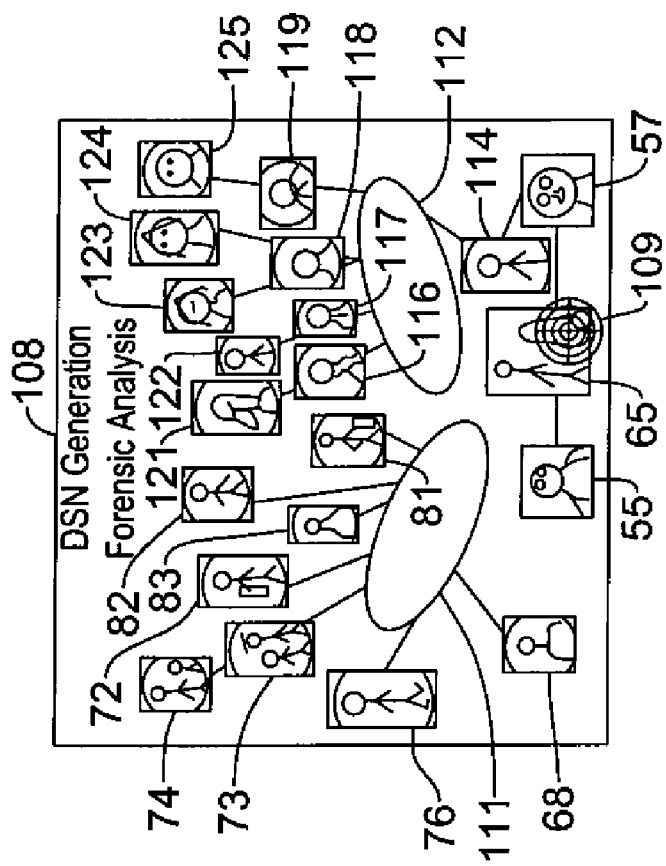
FIG. 2 is a diagram showing generation of a dynamic social network resulting from forensic analysis and other tools.

Block 108 of FIG. 2 shows a generation of a dynamic social network resulting from forensic analysis and other tools. Image 65 reveals the luggage as being the trigger event with a target 109 situated on it. Face images 55 and 57 may be associated with the person next to the luggage recorded as participating in the abandonment of the luggage. The person of image 55 may be associated with the May Year D checkpoint breach and abandoned luggage. The person of image 57 may have been spotted in July Year D and through face association may be identified as the same person of image 57. Observation of the person in image 55 may reveal a dynamic social network of other persons shown diagrammatically with an oval 111. Subsequent observation of the person in image 57 may reveal another dynamic social network of other persons shown diagrammatically with an oval 112. The persons connected to ovals 111 and 112 may be listed in a block 113 to the right of block 108. Analysis and correlation of various persons and aspects of their interaction in the networks of ovals 111 and 112 may be made.

Oval 111 may link the person of image 55 with persons in images 68, 72, 73, 74, 76, 81, 82 and 83, which are discussed herein. Oval 112 may link the person of image 57 through a person in image 114. With this intermediary, the person of image 57 may be linked to persons in images 116, 117, 118 and 119. Further linkage to persons 121, 122, 123 and 124, and 125 may be made via the persons in images 116, 117, 118 and 119, respectively.

A dynamic social network may be built from video surveillance data. A two-mode social network with actors and events may be considered. Linkages between actors may represent the joint participation in events. A challenge may occur because in the real video surveillance, a single actor may have several signatures due to a number of reasons, including imperfect tracking, the difficulty in identifying the same actor in a different camera's field of view, and so forth. So it may be necessary to accurately correlate multiple instances of the same actor.

There may be a one-way data mining of video analytics data to build up the social network data. However, if one has object association information, the approach does not necessarily provide feedback to the constructed social network. Moreover, the constructed social network data does not necessarily provide feedback to improve the recognition and correlation of new actors against those previously seen and categorized in the social network.

A feature of the approach is that the multiple social networks in each camera's field of view may be connected.

A social network may be built using the video analytics without object association. Results of this approach may be several isolated networks, or groups. Each network may be represented by a sub-graph, in which the node represents actors and the link represents the relationship between the actors. The weight of the link may be proportional to the number the joint participation in events by the actors.

Next, object association may be performed. For instance, face association may be used. Each actor's face in each sub-graph may have a similarity value to the actors' face in another sub-graph. A covariance based appearance model may be used for the actor's face, and a probability value may be defined based on the similarity value between two actors' faces.

After that, the face association probability table may be used to give feedback on the existing social network sub-graph. The feedback may improve its accuracy, especially when either integrating multiple social networks derived from a single camera view (e.g., integrating the separate social networks built up during the course of many days), or integrating the multiple social networks built up from multiple cameras over time.

The approach may include a series of steps. The steps may be receive incoming video data and automatically process the data to identify actors and/or faces. Additionally, for each actor/face identified in the video data, one may compute a list of previously seen faces from an archived database (i.e., the complete and integrated social network data), use video analytics techniques augmented with social network data to sort and/or rank each face in the list in order to quantify how similar each one is to the new face, and use the sorted list and/or rankings to integrate the new social network data to the database of previous social network data.

Extensions of the multi-constraint, multi-objective graph partitioning formulations may be used to support the integration of new actors/faces. These formulations may associate a vector, vwgt, of size n to each vertex in a graph. The value of vwgt[i] may indicate the $i^{th}$ weight of the associated vertex. Similarly, each edge may have an associated weight vector of size m. These vectors of weights may be used to specify both correlation probabilities as well as additional property or type information in the graph. The approach may use these formulations to specify that two actors from different social networks are equivalent with probability p. Such quantified relationships may then be used to integrate and merge separate social network data. In other words, video analytics may provide a basis for a social network and information from the social network may be provided back to the video analytics.

Figures 3A, 3B, 3C, 3D:
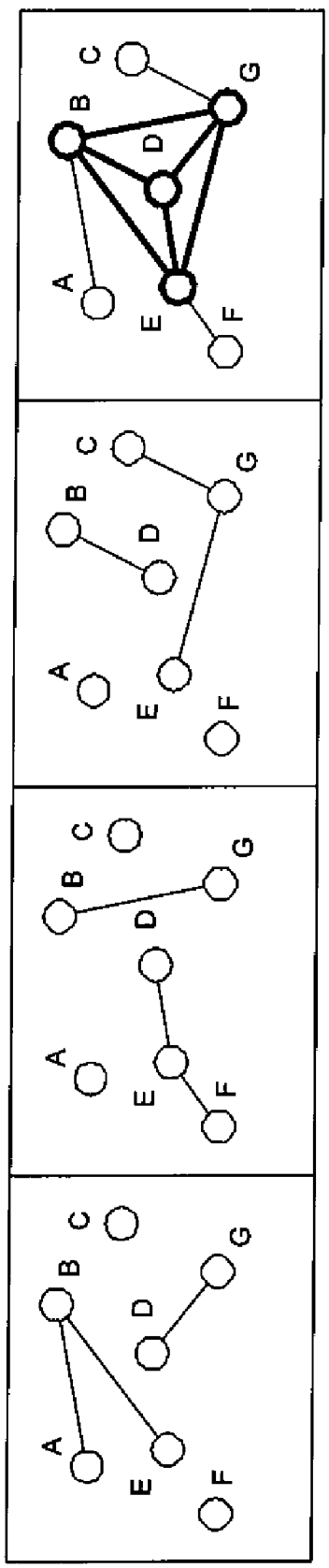
FIGS. 3a, 3b and 3c are diagrams of three social networks.
FIG. 3d is a diagram of a cluster resulting from a combining of the social networks in FIGS. 3a, 3b and 3c.

There may be probability-aware graph-based data mining for video analytics. Graph-based partitioning, clustering, and pattern detection algorithms may be regarded to be fast, scalable, and effective in analyzing various forms of network data. However, certain formulations and algorithms may require complete and certain knowledge of the structure of the graph. In the video analytics domain, the unified social network may have many probabilistic correlations across the nodes A-G and arcs. Thus, such approaches may be insufficient. FIGS. 3a, 3b and 3c show three social networks, respectively. If the corresponding nodes of each network can be correlated to the same real world phenomena with high confidence, the network in FIG. 3d may be the result. Clustering algorithms may detect the cluster BEDG in FIG. 3d.

The approach may collapse multiple social nets using probability or weighted arcs across nets. A challenge may occur for multi-modal networks in which corresponding nodes cannot be correlated with high confidence by the network unification framework. Related art graph-based data mining algorithms that do not take into account these probabilities cannot necessarily find the cluster BEDG in a FIGS. 3a-3c.

Figure 4:
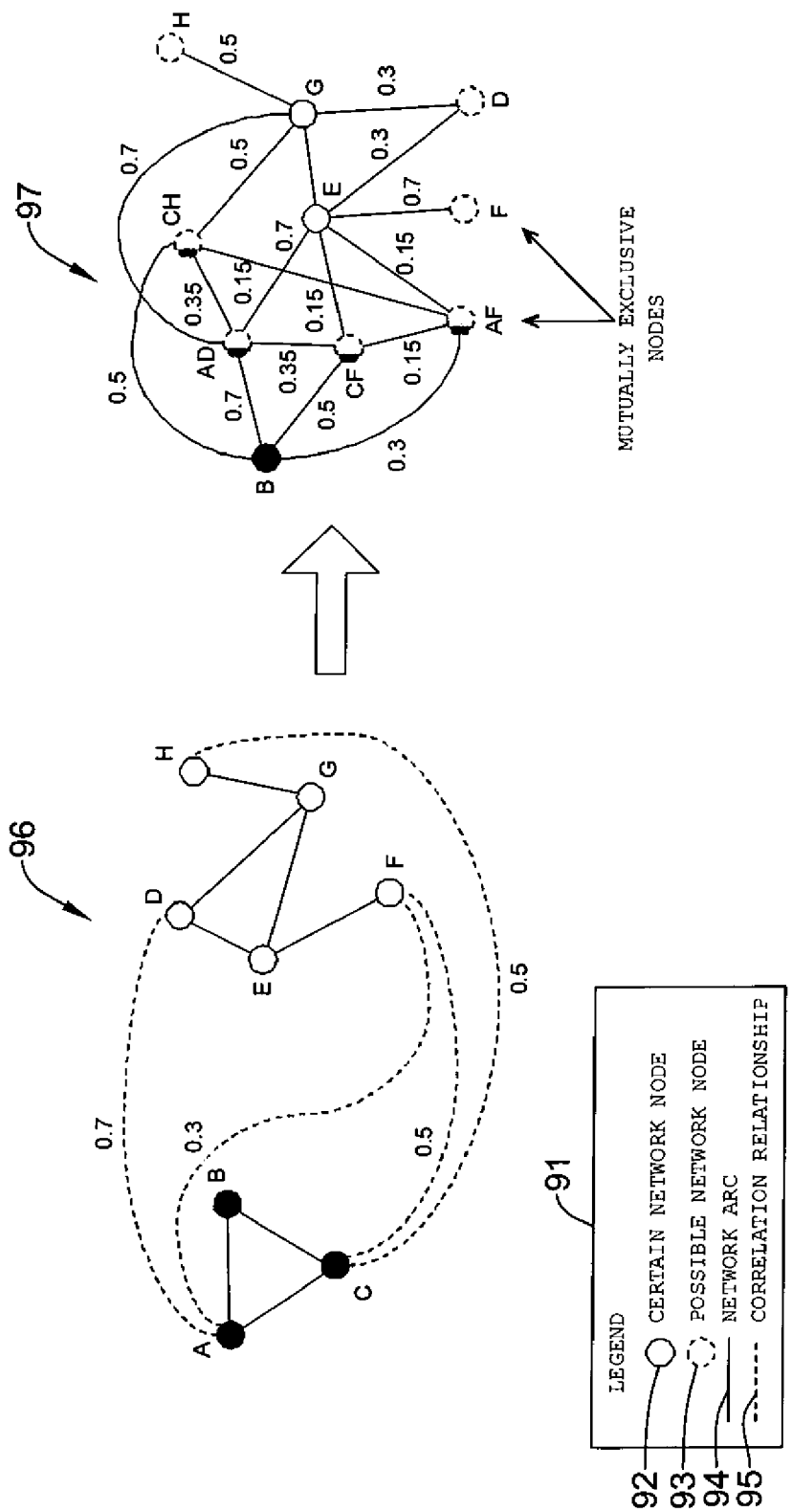
FIG. 4 is a diagram of a weighted graph transformed from a system of correlated graphs.

The approach may include a suite of "probability-aware" problem formulations for useful graph algorithms which may be needed to compute integrated solutions. The following facts may be exploited. First, network nodes and arcs are similar in nature, and thus can be meaningfully combined. Second, nodes in the same network represent different real-world entities. One may transform the system of correlated graphs into a single, weighted graph, as shown in FIG. 4, that graph-based data mining algorithms can handle.

Even a simplest case may be problematic such as what it means when mutually exclusive (ME) nodes are clustered together. Possible approaches may include to guide/influence the results, such as auto-insertion of meta-edges (e.g., negative edge weights between ME nodes) and semi-supervised clustering. Then, one may note the results in FIG. 5.

FIG. 3a shows social links B-A, B-E and D-G. FIG. 3b shows links E-F, E-D and B-G. FIG. 3c show links G-C, G-E and B-D. Combining the social networks of FIGS. 3a, 3b and 3c results in the cluster BEDG in FIG. 3d, as indicated by links BE, BD, BG, DG, ED and EG.

Figure 5:
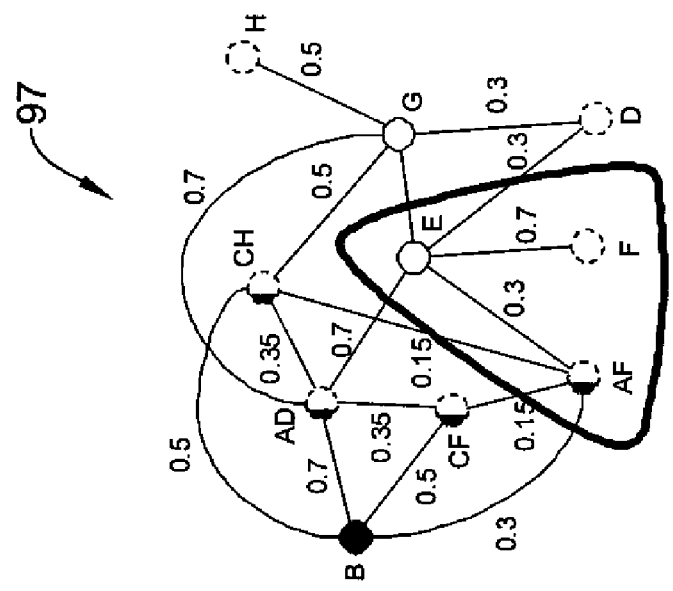
FIG. 5 shows a diagram having an enclosure of node E and mutually exclusive nodes AF and F.

A legend 91 indicates that a solid line circle 92 represents a certain network node and a dashed line circle 93 represents a possible network node. A solid line 94 represents a network arc and a dashed line 95 represents a correlation relationship. The left diagram 96 has certain network nodes A, B, C, D, E, F, G and H. There are correlation relationships indicated between nodes A-D of 0.7 probability, nodes A-F of 0.3 probability, nodes C-F of 0.5 probability, and nodes C-H of 0.5 probability. Diagram 96 may be transformed into a diagram 97 where the certain and possible network nodes are connected with network arcs with weights associated with them. Certain network node B may have a 0.5 weighted network arc with possible network node CH, a 0.7 weighted network arc with possible network node AD, a 0.5 weighted network arc with possible network node CF, and a 0.3 weighted network arc with possible network node AF. Possible network node AD may have a 0.7 weighted network arc with certain network node G, a 0.35 weighted network arc with possible network node CH, a 0.7 weighted network arc with certain network node E, and a 0.35 weighted network arc with possible network node CF. Possible network node CF may have a 0.15 weighted network arc with certain network node E, and a 0.15 weighted network arc with possible network node AF. Possible network node AF may have a 0.15 weighted network arc with possible network node CH, and a 0.15 weighted network arc with certain network node E. Possible network node CH may have a 0.5 weighted network arc with certain network node G. Certain network node may have a network arc with certain network node G, a 0.3 weighted network arc with possible network node D and a 0.7 weighted network arc with possible network node F. Certain network node G may have a 0.5 weighted network arc with possible network node H, and a 0.3 weighted network arc with possible network node D. It may be noted that possible network nodes AF and F are mutually exclusive nodes. FIG. 5 shows diagram 97 with a heavy line enclosing node E and mutually exclusive nodes AF and F.

There may be a social network construction system having a first layer for capturing image data and identifying actors and events in the image data, a second layer for indicating which actors are involved in which events, and a third layer for inferring links between actors from the second layer and constructing a two or more social networks. The third layer may be for further assigning weights to at least some of the links between the actors which result from events in which the actors are involved. A weight may indicate strength of a link between the actors.

The two or more social networks may be collapsed into one social network. The two or more social networks may be transformed into correlated graphs which are transformed into a single weighted graph. Data mining algorithms may be used on the single weighted graph to find data, detect one or more clusters, and other information.

Temporal social groups may be discovered from video data. An approach may be to associate people with a social group, which are not observed together at the same time, but rather appear at the same spatial location in some temporal pattern which is repeated in different spatial locations. Identified people may frequent different spatial locations at different times in similar temporal patterns.

People detection may be based on video analytics, the people association may be based on face recognition and indexing, and the temporal pattern discovery may be based on sequence matching. One may concentrate on extracting and identifying these social groups in large areas and crowded environments as observed by multiple video cameras (e.g., airports, sports arenas, theme parks, and so on). An example of temporal pattern discovery, to be detected may include identifying whether certain individuals follow each other in such a way that they do not appear in the camera field of view at the same time, but after few minutes, for example, a certain individual following one or more others may be observable after a lapse of time in more than one camera.

A pattern of temporal social group association may be extracted from a single camera or multiple cameras. A single camera may involve different time slices. That is, one may process video from one camera on day one and then process video from the same camera on day two (or at hour one and hour two). Then, one may determine if the same people were observed with the same temporal pattern in day one and day two, or respective hours. With multiple cameras, one may process video from each of the cameras in the network, extract temporal patterns, and match the patterns across the cameras.

A pattern of temporal social group association may be initiated by a single individual or a group of individuals. In the case of a single individual, a person that is identified as a person of interest may be based on a security officer selection, and/or based on a video analytics activity recognition module (i.e., a person detected breaching a security checkpoint or a person loitering). A sequence of people in temporal proximity to the person of interest may be matched across cameras to seek and identify any temporal patterns.

A pattern of social group association may be initiated by a group of individuals. A temporal pattern may be sought of a known group of individuals. The individuals may be matched to the video analytics data to see if they occupied the same spatial location at different times, and whether this type occupying occurred at more than one location.

Extracting temporal social groups may be done according a sequence noted in the following. Video analytics may be performed on the images from one or more cameras. Video analytics per each camera may include people detection, face detection, face indexing, and so on. Given an individual of interest, a sequence may be created of people detected in predefined time span in each of the video cameras. Face association may be performed between faces in one camera sequence with faces in other camera sequences. From face association, people may be detected in each camera sequence, which appear in a temporal pattern. The temporal pattern may be not necessarily exact. A flexible definition of a temporal pattern may include a situation where A appears first, then sometime later B appears, and finally C appears. The temporal delta between appearances need not be necessarily defined with exact time dimensions.

Given a group of individuals, there may be created a sequence of individuals detected within a predefined time span in each of the video cameras. Face association may be performed between individuals of the given group and individuals in the sequences from each video camera. Temporal patterns may be detected involving the individuals from the group only. Face association may be performed on other individuals in the sequence. There may be detection of other individuals beyond the group to discover any other temporal patterns.

The approach may include an algorithm working concurrently with video analytics to extract temporal social patterns from video data. The algorithm may be incorporated into existing video surveillance systems to obtain additional data for interested entities such as security personnel.

Extracted video analytics data may be stored in an external storage device. The input to the surveillance system may include an individual of interest or a group of individuals. Face association may be performed to provide close matches between faces detected in different cameras. Matching and/or counting of individuals may be performed to detect any temporal patterns between camera sequences.

Figure 6:
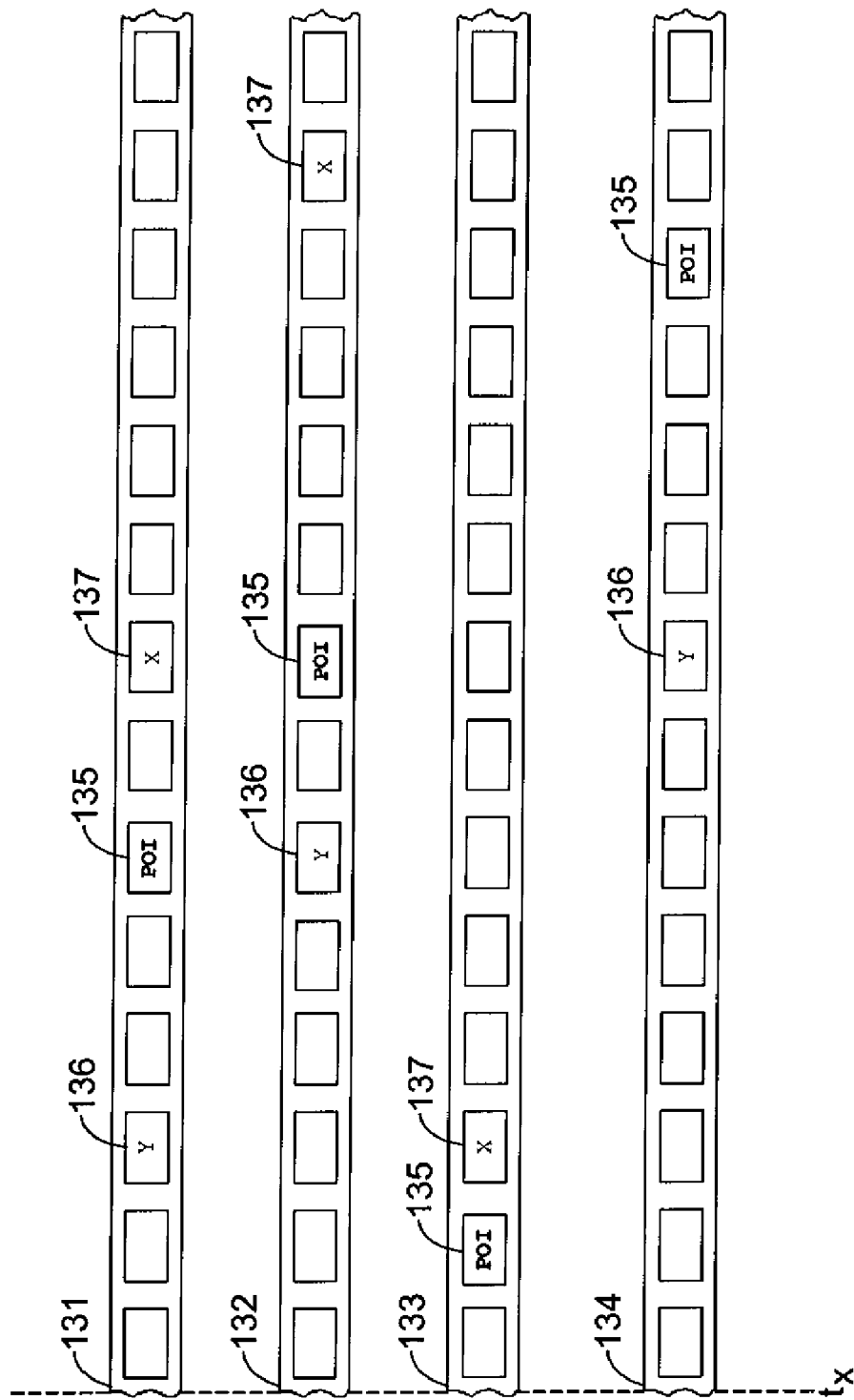
FIGS. 6 and 7 show frames of video tapes from several cameras at different locations in a facility.
Figure 7:
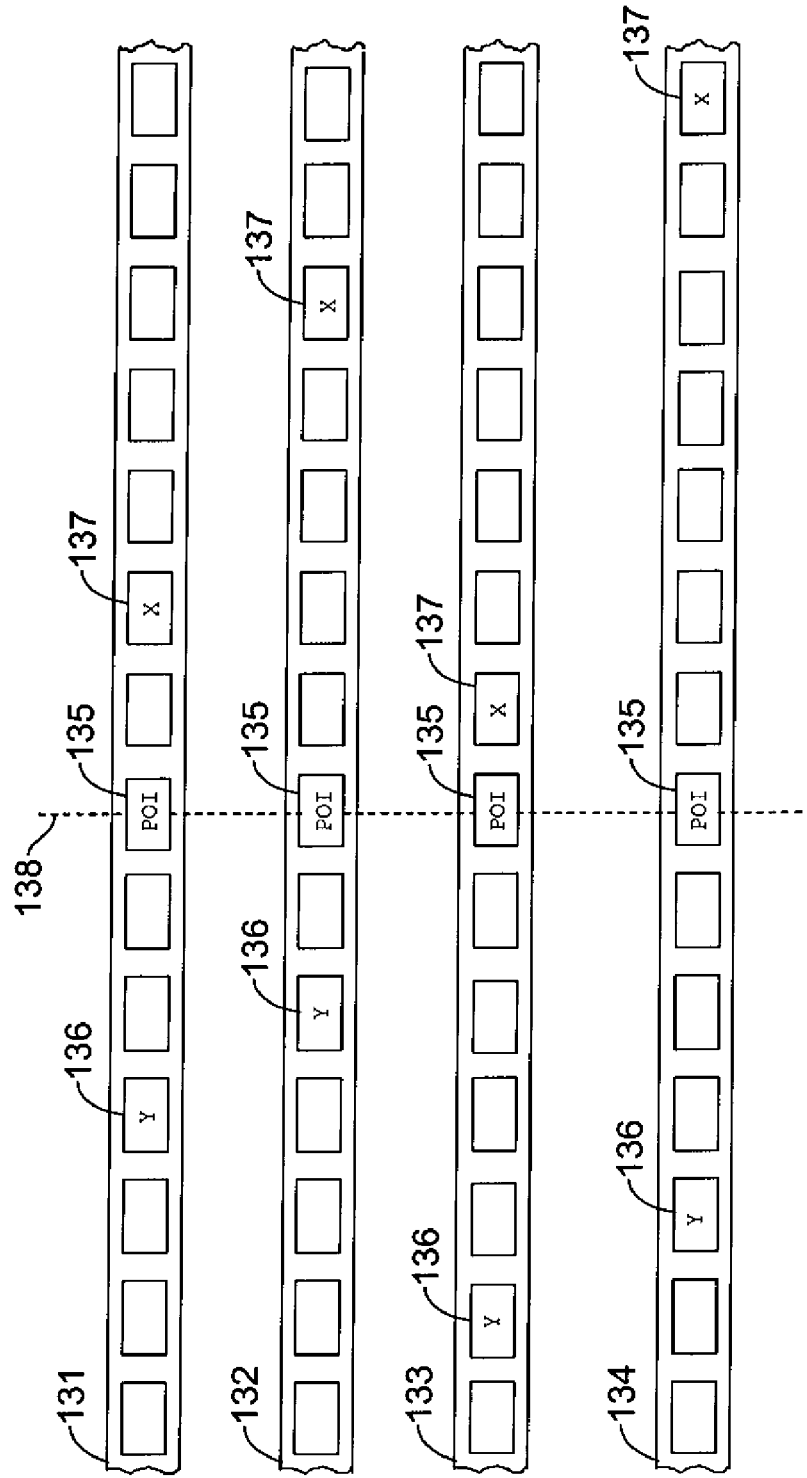

FIG. 6 shows frames of video tapes of 131, 132, 133 and 134 from four cameras at different locations in a facility such as an airport. A point of time $t_x$ is where a beginning cut is made of these video tapes for illustration purposes. A point of interest (POI) 135 may be a person that was pre-selected for surveillance which may have been a result of a security alert or some other factor. Manual pre-selection may be an act by person doing the selection. Automatic pre-selection may be an event of a person running, loitering, dropping baggage, or the like, resulting in a detection module to select the person causing the event. One may note that the point of interest (POI) 135 as found appearing at various times on each in each of the tapes 131, 132, 133 and 134. The POI 135 or person 135 may be identified in each of the tapes 131, 132, 133 and 134 with face association or another identifying approach. Other people present in the tapes 131, 132, 133 and 134 may be identified in the tapes through similar person identifying approaches, which appear within a reasonable period in time of the appearance of POI 135. For example, a person Y 136 may be identified in at least three tapes 131, 132, and 134 after $t_x$. It may be noted that person 136 appears some time after POI 135 appears. Also, a person X 137 may be identified in at least three tapes 131, 132 and 133. It may be noted that person X 137 appears some time before POI 135. To improve this analysis, one may align the tapes according to POI 135 as shown in FIG. 7 and indicated by line 138. It may be more clearly noted in FIG. 7 that X 137 appears before POI 135 and that Y 136 appears after POI 135 in tapes 131, 132, 133 and 134. The sequence of X 137, POI 135 and Y 136 in the tapes 131, 132, 133 and 134 give rise to a temporal association among these three persons 135, 136 and 137. The association or pattern may be denoted as $((Y) \Delta t_1 (POI) \Delta t_2 (X)) \rightarrow YPX$. There may be more ($\geq 4$) or less (i.e., 2) persons temporally associated through video tapes. There may be more ($\geq 5$) or less (i.e., 2) cameras in surveillance at various locations of the facility. The temporal spread between the persons observed may vary from camera to camera. There may be interruptions, such as talking to some one, going to the restroom, and so forth by one or more of the persons being observed. The temporal order and time gaps between persons may vary occasionally; however, a certain amount of consistency will permit inference of temporal association among the persons identified in a sufficient number of video tapes. Temporal association may be rather complex involving numerous people and camera locations in a large facility or several facilities including outside areas. There may be a combination where POI 135, X 137 and/or Y 136 may represent more than one person.

There may be a system for discovering a social group, having several cameras for providing video data from various locations, and a video analytics mechanism connected to the cameras. The video analytics mechanism may be used for recognizing a person of interest in video data, identifying people in temporal proximity to the person of interest from the video data, and for identifying a temporal pattern of people in temporal proximity to the person of interest. The temporal pattern may reveal a social group.

The video analytics mechanism may utilize face recognition for identifying a person of interest in video data and for identifying people in temporal proximity to the person of interest from the video data.

The person of interest may be pre-selected for surveillance. Pre-selection may be manual or automatic. Manual pre-selection may involve another person picking the person of interest to be pre-selected. Automatic pre-selection may involves a detection module having hardware and/or software for picking the person of interest to be pre-selected.

People in temporal proximity to the person of interest may be identified across at least some of the cameras. Temporal proximity may be a time gap no longer than a specified or selected period of time. The person of interest may constitute one or more persons, such as a group of people.

Temporal proximity may be indicated by one or more people present at a location at a first time and a person of interest present at the location at a second time. Also, there may be one or more people present at the location at a third time. The location may be a field of view of each of two or more cameras. The fields of view of the two or more cameras do not necessarily overlap.

Two or more temporal patterns of the persons may be detected in one or more cameras. The two or more temporal patterns may be compared to obtain a common temporal pattern of the persons in the one or more cameras. The common temporal pattern may reveal a social group.

Figure 8:
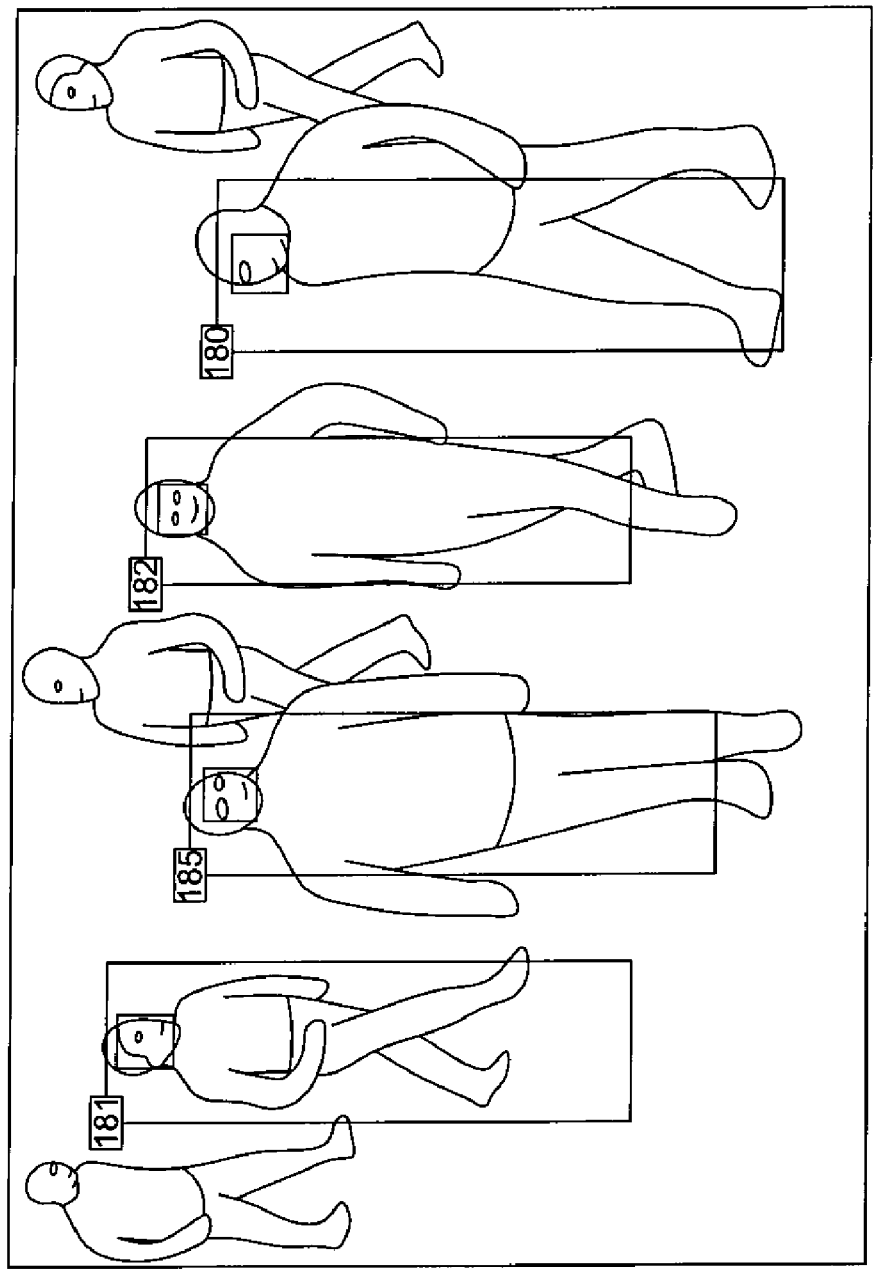
FIG. 8 shows a picture of labeled body and face bounding boxes.

FIG. 8 shows an automatically labeled body and face bounding boxes. ID of the person is unique for one camera only.

There may be object association across cameras. The occurrence of each person can appear in all multiple cameras. For the association people across cameras a mapping table is used. Each column of the table corresponds to one camera. First column contains unique ID of particular unique person. Each row corresponds to one unique object (object with unique ID). Each cell contains IDs of objects in particular camera which corresponds to one unique object.

Mapping Table:

| Object | Camera 1 | Camera 2 | Camera 3 |
|---|---|---|---|
| 1 | 1 |   | 2 |
| 10 | 3 | 1 | 8 |
| 11 | 2 5 | 7 |   |

Camera1; Camera2; and Camera3—names of the cameras.

1;1;;2—person 1 is presented in camera 1 and 3 only.

10;3;1;8—person 10 is presented in all cameras.

11;1 2 5;7;—person 11 is presented in camera 1 (three IDs) and camera 2.

IDs for each camera are separated by a semicolon.

This step can be substituted by manual setting of ID of particular person to the same number in all cameras.

Social network construction may be noted. Video analytics may generate the results of the first layer 11 of data, which will be the input of the second layer 12 for constructing the social network. In second layer 12, one may determine two types of information from first layer 11, such as events and descriptors.

Figure 9:
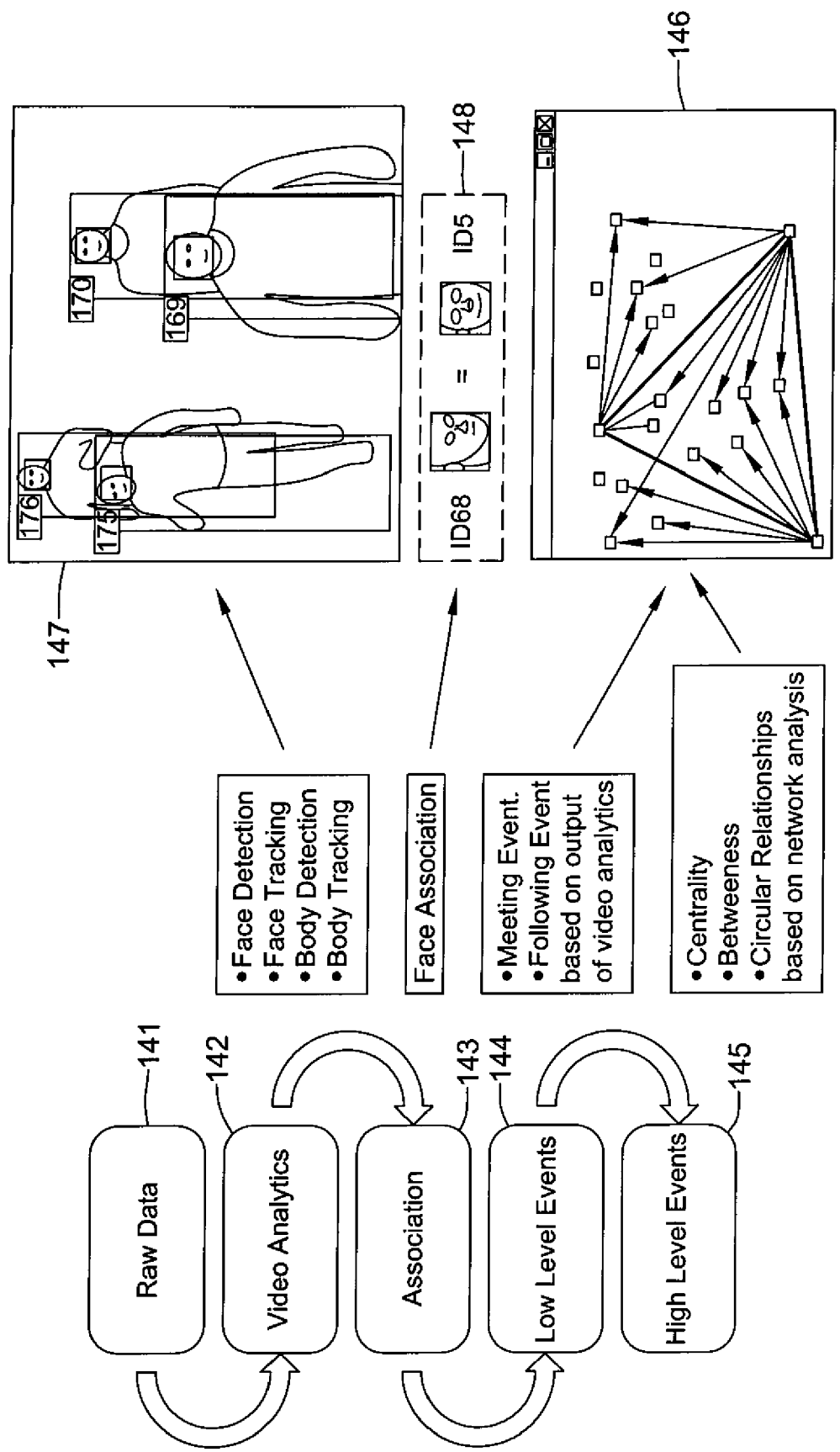
FIG. 9 is a diagram of steps for a dynamic social network.

A dynamic social network may be created in several steps as shown in FIG. 2. First, video analytics 142 and face association 143 may be applied to raw data 141. There may be face detection and tracking, and body detection and tracking, as may be indicated by the face and body rectangles superimposed on the faces and bodies of people in the raw data or video as illustrated by a video frame 147 in FIG. 9. ID numbers may be assigned to these rectangles. A face association mechanism may compare rectangles of faces in various frames, video and the like, and note associations of faces such as ID 68 being equated to ID 5, as shown in illustration 148 of FIG. 9.

Low level events and descriptors may be determined from the results of video processing 142 and 143. Finally, high level information 145 may be determined by post processing of the social network.

Events may include meeting event and following event based on output of video analytics. Events may involve centrality, betweeness and circular relationships based on network analysis.

One may use a custom off-the shelf (COTS) visualization tool 146 for visualization of a social network. The information about social network is stored into a DSN.vna file which can be read by the tool. Several modifications of social network can be done by tool as visualization of selected relationships or thresholding of relationships.

There may be three types of social networks. The first type may be an attribute network. In this type of network, there are a people-camera relationship and a people-time relationship. This type of network is a basic network, which needs no additional processing. It corresponds to the simple relationships, such as how long was the person 1 detected in camera 1.

The second type may be social network building using atomic (i.e., low level) events, such as meeting events, following events, and so on. There may be a layer representation to build the social network; however, one does not have object association information.

The third type is social network building using atomic events and object association information, which corresponds to more complicated relationships.

An attribute network may be noted. Each attribute describes simple relationship between objects and the environments. One may have two types of descriptors which include people-camera relationships and people-time relationships.

People-camera is a relationship between particular person and particular camera. It is defined as duration when particular person occurs in particular camera. The relationship is stored into PCmatrix with dimension N*C where N is number of people and C is number of cameras. Each ceil i,j of the matrix corresponds to the time when person i occurs in camera j.

Figure 10:
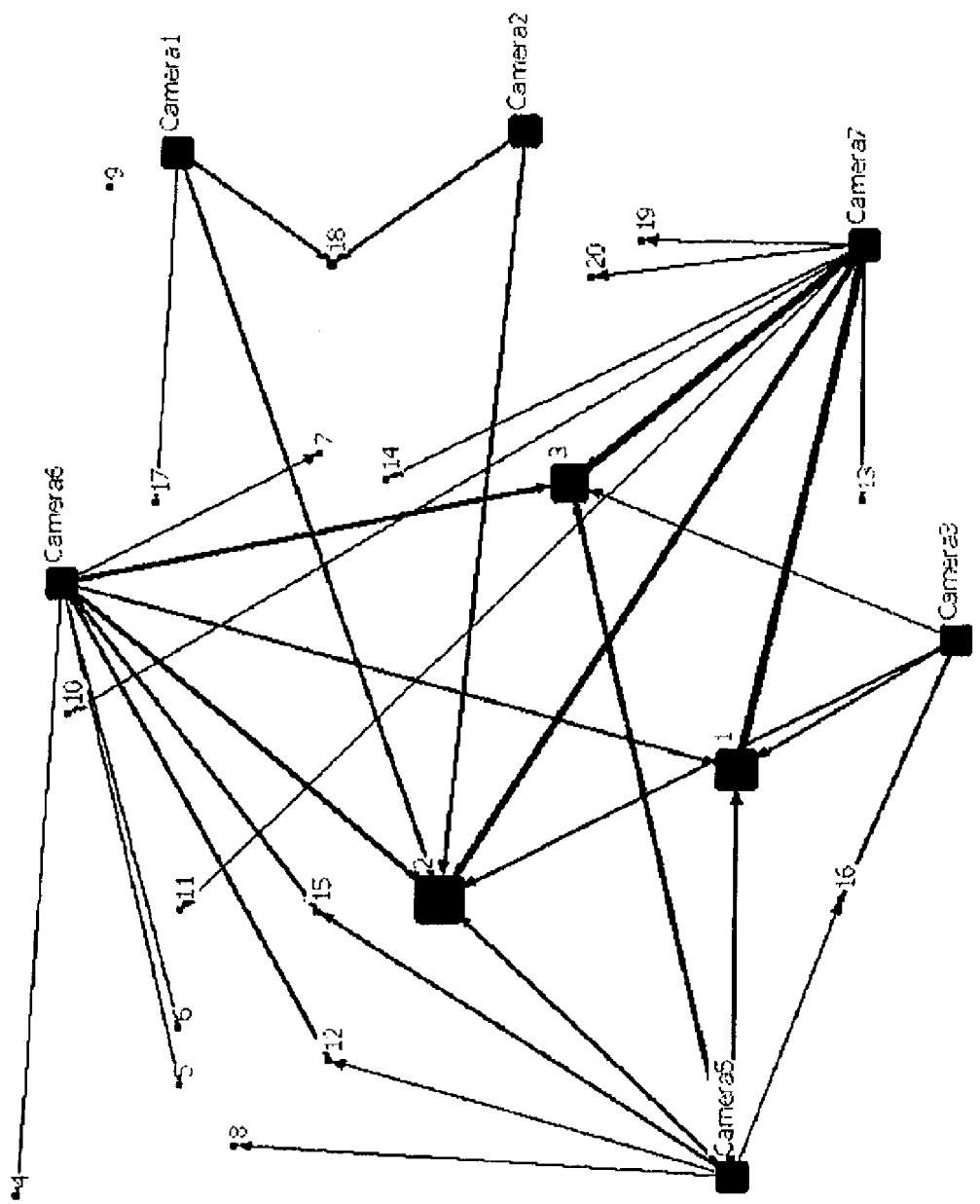
FIG. 10 is a diagram of an example people-camera relationship.

A people-camera descriptor may create ties between people and cameras in social network as shown at FIG. 10. Cameras are represented by nodes in the social network. It can be seen that person 1 spent most of the time in camera 7.

FIG. 10 shows an example of a people-camera relationship, nodes=cameras, nodes=people. A people-time is a descriptor which determines how long was particular person detected in all cameras. It is defined as duration when particular person occurs in all cameras. The descriptor helps to better understand to the social network. If one person has many relationships and was detected for long time interval than it can be normal but if the person has many relationships but was detected for short time interval than it is strange.

People-time descriptor modifies the size of nodes in social network as shown at FIG. 10. It can be seen that person 2 was most often detected person.

People-people relationship is defined as duration when two particular people were closer than defined threshold. The relationship is stored into PPmatrix with dimension N*N where N is number of people. Each ceil i,j of the matrix corresponds to the time when person i and person j were closer than threshold.

The distance between people may be calculated by equation 1.

Figure 12:
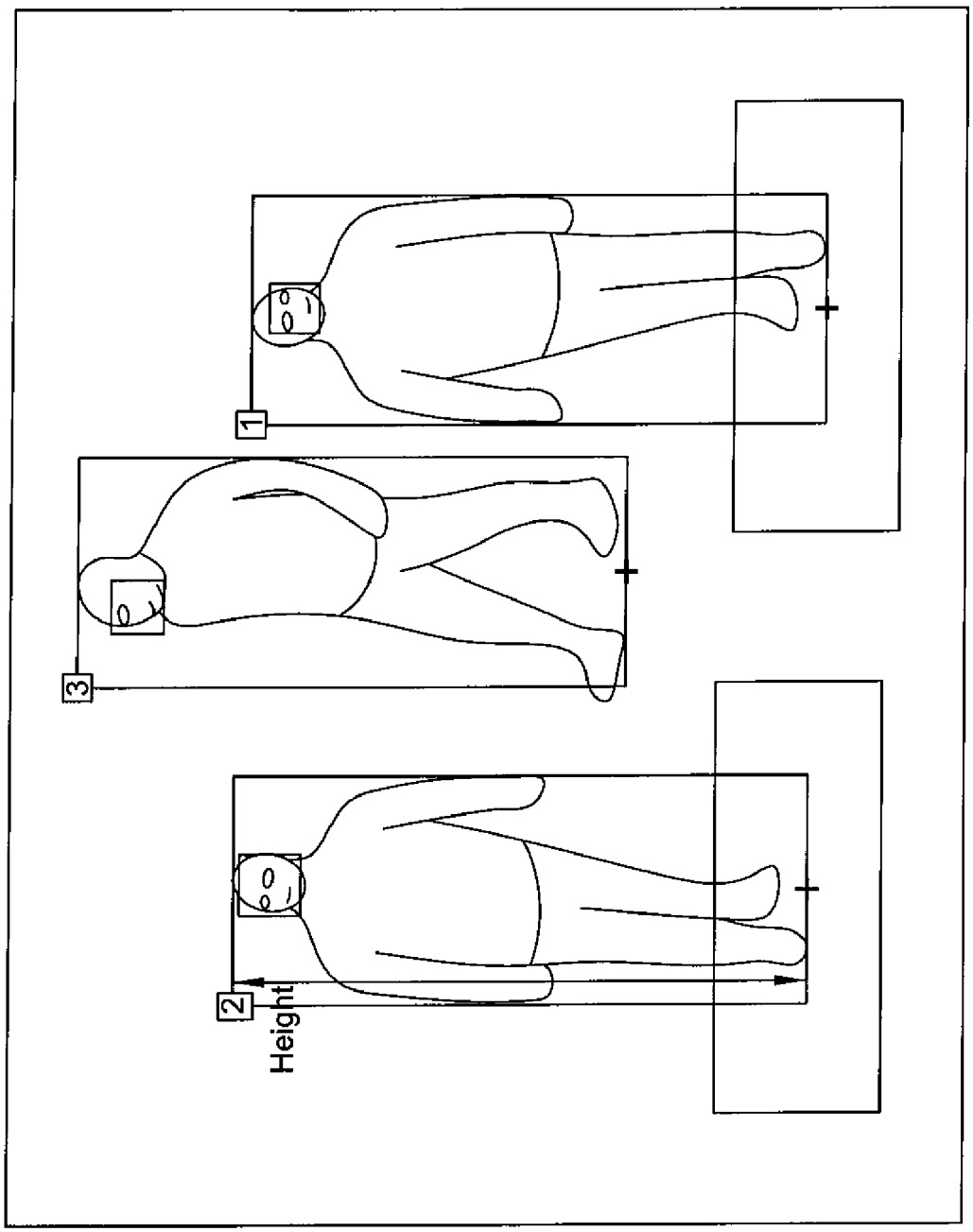
FIG. 12 is a picture illustrating a neighborhood for events detection.

$|xp_1-xp_2|<neighX$ and $|yp_1-yp_2|<neighY$ $neighX=height_1*thresX$ $neighY=height_1*thresY$ Where $xp_1(k)$, $yp_1(k)$ is x and y position of person 1 at time k, $xp_2(k)$, $yp_2(k)$ is x and y position of person 2 at time k, t is duration (20 s) of Rule1, T is time threshold, thresX, thresY are defined constants (2, 1) and $height_1$ is height of body rectangle of person 1 who is closer to the camera than person 2. One may be using the height of person which is closer to the camera for calculation of distance because the distance between people depends on the position of people in the space (because of perspective). One may assume that the height of people is similar and then one can use the height of person for normalization. The calculation of distance is shown in FIG. 12.

Figure 11:
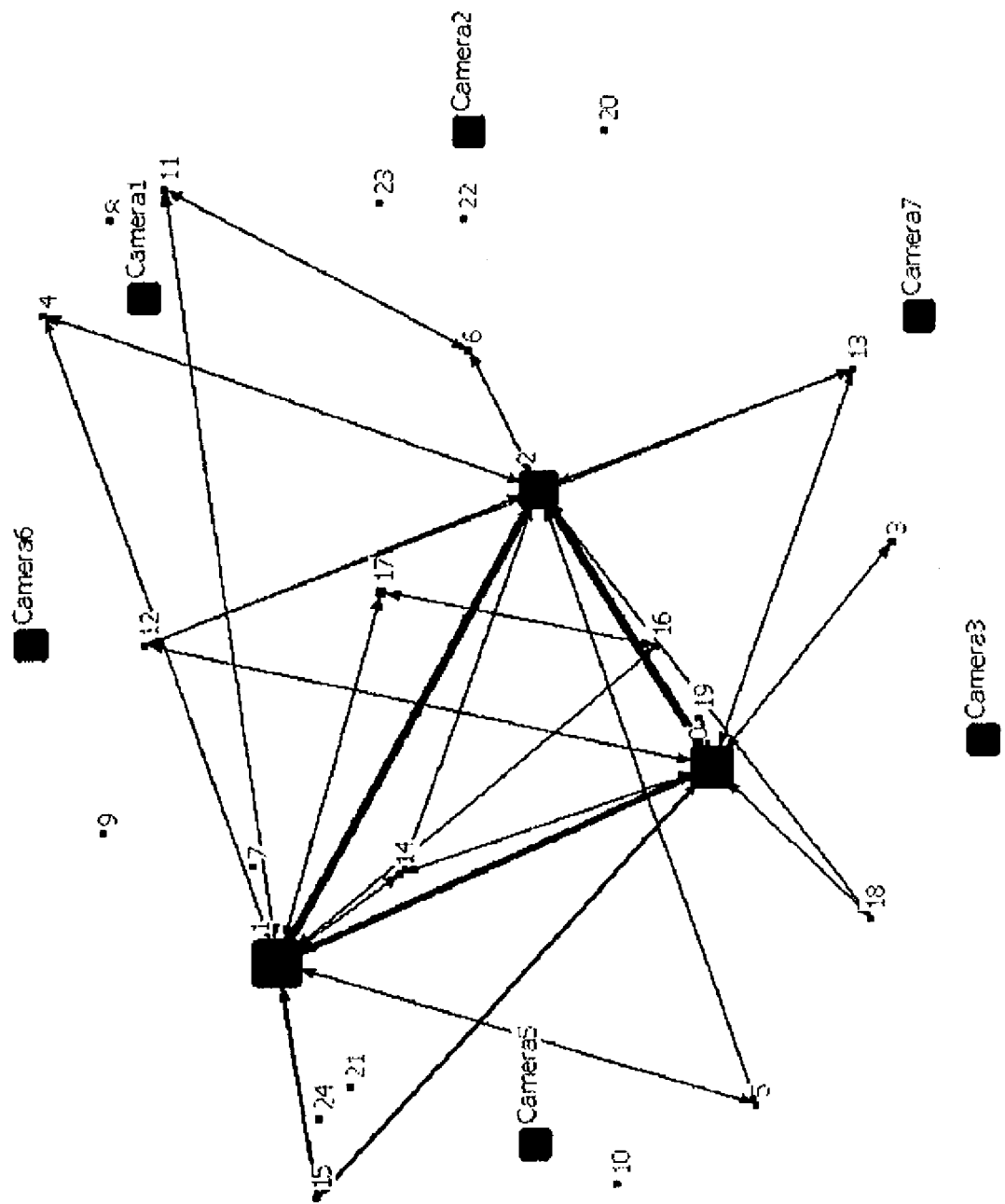
FIG. 11 is a diagram of an example of people-people relationship.

FIG. 11 shows an example of people-people relationship. A people-people descriptor may create ties between people in social network as shown at FIG. 11. It can be seen that person 0 occurred close to the person 1 and 2 most of the time of his occurrence.

Social network building using atomic events may be noted. In this section, one may consider two atomic events in this report: meeting event and following event.

Meeting events may occur if one person occurs in neighborhood of second person for period longer than defined time threshold and both of them stop at the same position. Neighborhood is defined as rectangle around the center of bottom line of body rectangle of the person.

Meeting event is visualized as tie between people nodes. The weight of the tie corresponds to the number of meetings between particular people.

The event is detected if rule1, rule2 and rule3 are true:

$|xp_1 - xp_2| < neighX$ and $|yp_1 - yp_2| < neighY$      Rule 1
$neighX = height_1 * thresX$
$neighY = height_1 * thresY$ $|xp_1(0) - xp_1(t)| < \frac{neightX}{4}$ & $|xp_2(0) - xp_2(t)| <$      Rule 2
$\frac{neightX}{4}$ | & $yp_1(0) - yp_1(t)| < \frac{neightY}{4}$
& $|yp_2(0) - yp_2(t)| < \frac{neightY}{4}$ $t <= T$      Rule 3

Where $xp_1(k)$, $yp_1(k)$ is x and y position of person 1 at time k, $xp_2(k)$, $yp_2(k)$ is x and y position of person 2 at time k, t is duration (20 s) of Rule1, T is time threshold, thresX, thresY are defined constants (2, 1) and $height_1$ is height of body rectangle of person 1 who is closer to the camera than person 2. The illustration of neighborhood is shown in FIG. 12.

First the people-event matrix for meeting events is created. Each row of matrix corresponds to the person ($P_1$-$P_n$) and each column corresponds to unique meeting event ($E_1$-$E_m$). If the person $P_p$ participate on the event $E_e$ then the ceil $P_{p,e}$ is 1 otherwise 0.

FIG. 12a shows a table of a people-events matrix. For determination of the weight of meeting events the meeting matrix is calculated from people-event matrix. Each row and column corresponds to the person. Each ceil $PP_{i,j}$ represent the number of meetings between person $P_i$ and person $P_j$.

FIG. 12b shows a table of a people-people matrix. The value of $PP_{i,j}$ represents how strong is the relationship between person i and j and it is calculated from people-event matrix as:

$$PP_{i,j} = \sum_{m=1}^{m} P_{i,m} * P_{j,m} \quad (1)$$

The following event is defined as event where person ID1 follows another person ID2 twice (at two different times). The following event is detected in two steps. First all F events where person ID1 occurs in particular camera and person ID2 occurs in the same camera after ID1 are detected for all IDs and all cameras. The delay between occurrences have to be longer than T1 (1 s) and shorter than T2 (5 minutes). In the second step the following event is detected if F event was detected at least twice for the same people. The following events are visualized in social network as new relationship called following. The relationship is visualized as tie between particular nodes (IDs). The arrow directs from the person who follow to the person who is followed. Following event is defined just for two people. The weight of the relationship corresponds to the number of F events minus one for particular pair of people.

Many events which are not real following events are detected for this definition of following event where just time constraint is defined. For example if person ID1 occurs at left upper corner of camera and walk to the right bottom corner and person ID2 occurs after ID1 at right bottom corner and walk to the left upper corned than it is not following event. One may extend the definition of following event by space constraint. The definition of space constraint is that the general direction of both people has to be similar. The trajectory Ti of the person I is defined as $T_i = [x_1, y_1, x_2, y_2, \ldots, x_n, y_n]$ where $x_t$ and $y_t$ are coordinates of position at time t. The general direction $d_i$ is calculated by Eq. 1.

$$d_i = \arctan\left(\frac{\sum_{k=1}^{n-1} x_k - x_{k+1}}{\sum_{k=1}^{n-1} y_k - y_{k+1}}\right) \quad (2)$$

General angles for two people are similar if the difference between angles is lower than 45 degrees.

Following event is calculated in the same way as meeting event. First people-event matrix for following events is determined and then following matrix is calculated from people-event matrix. The following event is detected if the $PP_{i,j}$ is higher than 2.

FIG. 12 illustrates a definition of a neighborhood for events detection. A cross-center of bottom line of body rectangle, other rectangle-neighborhood.

There is a social network building using attributes, atomic events and object association information. The problem of video analytics as face detection and body detection is that they provide just the information about the position of person but no information about association. One may know that there is person in camera 1 and in camera 2 but one might not know that these are two occurrences of the same person. Therefore, face detection and body detection may provide redundant IDs of the same persons.

The network created without information about associations just reflects the information about separate occurrences of the people. That is the reason why one may be using association based on face association method.

First the face association is done. In this step the N most similar faces (IDs) are detected for each face (ID). Then the IDs are grouped together. There can be several scenarios of IDs grouping. One may select for each ID just one most similar association (IDA). In the second step one may have pairs of ID and IDA fro all IDs and one may group all IDs which are related through IDA into one group.

For Example:
ID pairs:

| ID | IDA |
|----|-----|
| 1  | 5   |
| 2  | 1   |
| 3  | 4   |
| 4  | 3   |
| 5  | 6   |
| 6  | 5   |

One may group the IDs into two groups (1, 5, 2, 6) and (3, 4). Each group has unique IDU. After an association, the number of IDs is significantly reduced and the attributes and events are calculated from unique IDUs. The attributes and events now correspond to the virtually all occurrences of the person in virtually all cameras.

Figure 13:
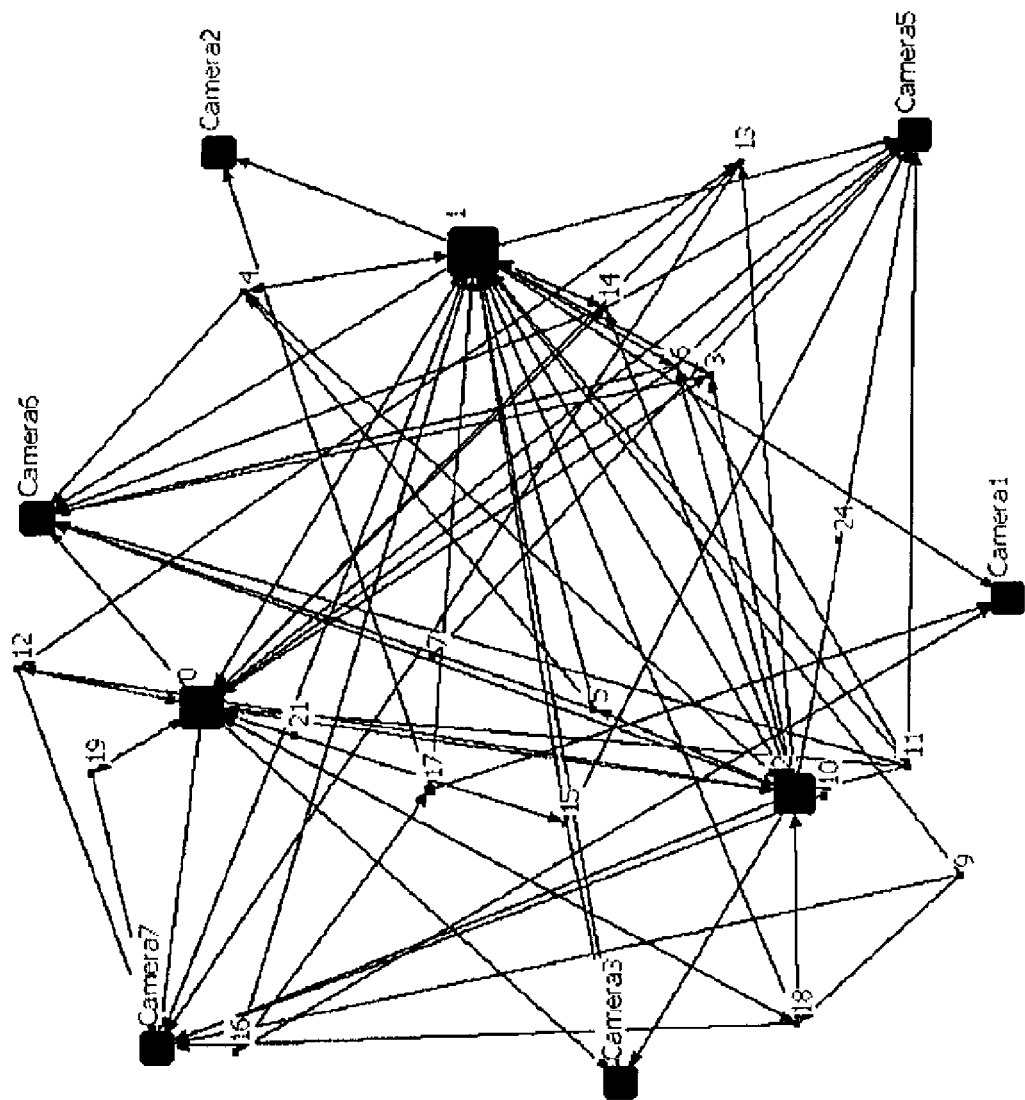
FIG. 13 is a diagram of a network created from associated IDs.
Figure 14:
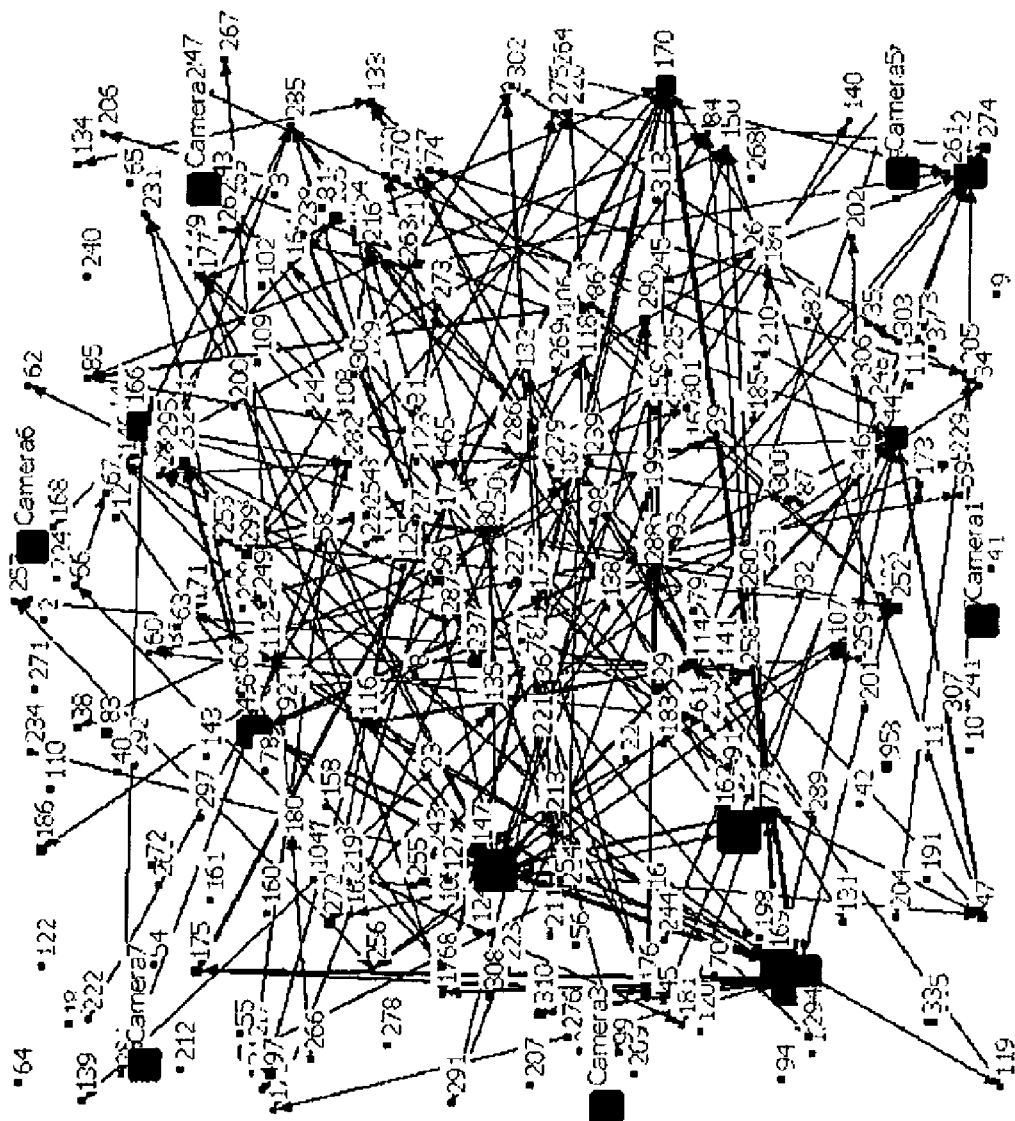
FIG. 14 is a diagram of a network created without associations.

FIG. 13 is a diagram showing a network created from associated IDs, and FIG. 14 is a diagram showing a network created without associations.

One may note a dataset. One may have collected data for about 30 minutes at a city airport. One may have video records from 6 video cameras. Two cameras have overlapping FOVs. Three actors may perform simple behavior, such as meeting, following leaving and picking up a backpack. One may calculate the number of meetings and following events between these three people and compare it to the results of social network creation.

Number of actor meetings–duration>20 s, neighborhood–thresX=2, thresY=1
ID0—ID1 1
ID0—ID2 1
ID1—ID2 2
Number of actor follow events is 9. Typically, person ID1 follows ID0 and ID2 follows ID1. The three actors occur for the longest time interval in the cameras and they walk very often together.

One may test three different scenarios. 1) Manually labeled dataset–the positions of face and body rectangles were labeled manually, face association was done manually. 2) Video analytics–the position of face and body rectangle were determined by video analytics, no association was done. 3) Video analytics+face association–the position of face and body rectangle were determined by video analytics, face association was done automatically.

Results for manual labeling may be noted. The face and body rectangles in video files were labeled manually together with association of objects across cameras. The three actors were labeled together with another 19 people. The results correspond to the acted scenarios of our three actors. The IDs 0, 1 and 2 represent our three actors. It can be seen from the results of created networks that these three IDs have the strongest relationships in all networks.

Figure 15:
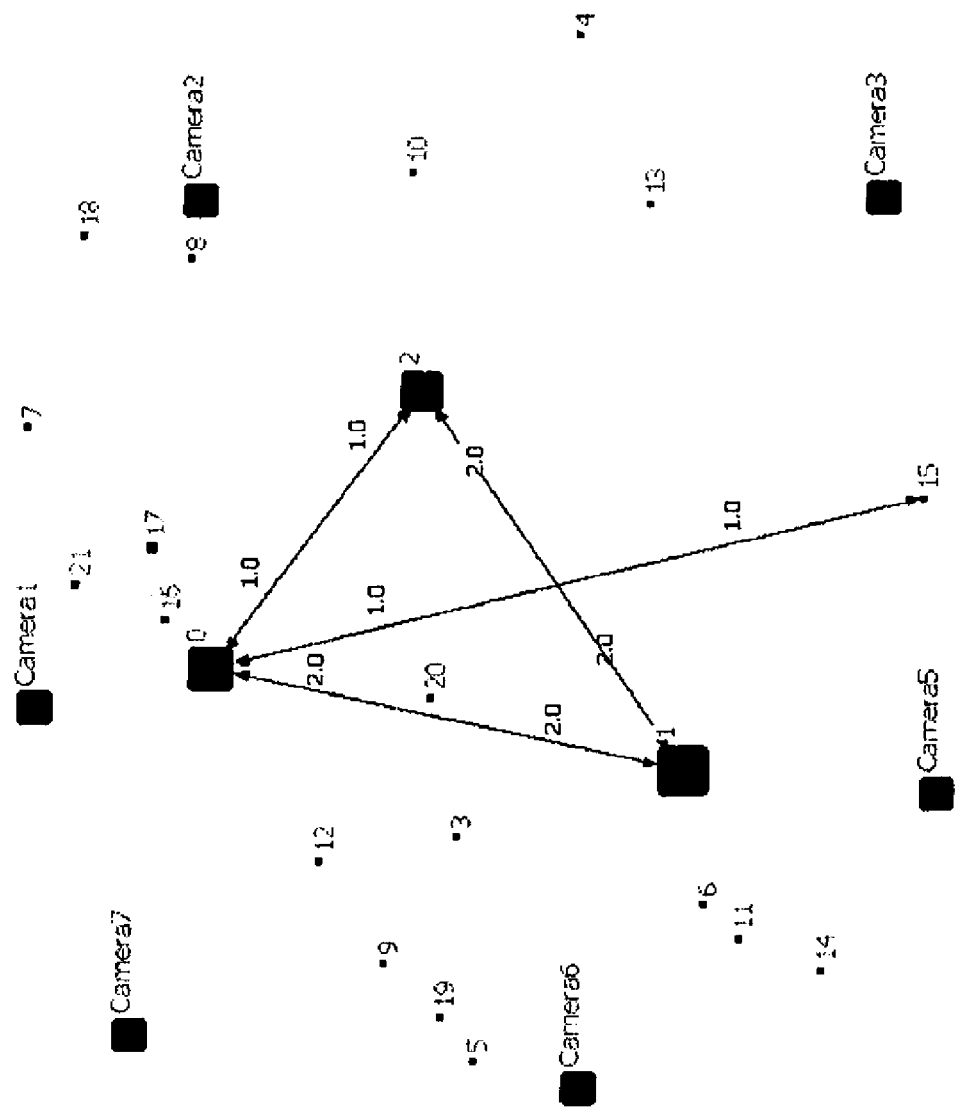
FIG. 15 is a diagram a meeting relationship.

The results of network creation using atomic events show that there are meeting events detected for the people ID0, ID1 and ID2 of FIG. 15. The following events are visualized in FIG. 16. It can be seen that 13 following events were detected where person ID1 follows person ID0. Number of acted follow events is nine. More events were detected because of the setting of parameters T1 and T2.

FIG. 15 shows a network of meeting relationships created by basic approach. Such network may be shown visualized by a COTS tool. Squares correspond to the objects. Lines show the relationships.

Figure 16:
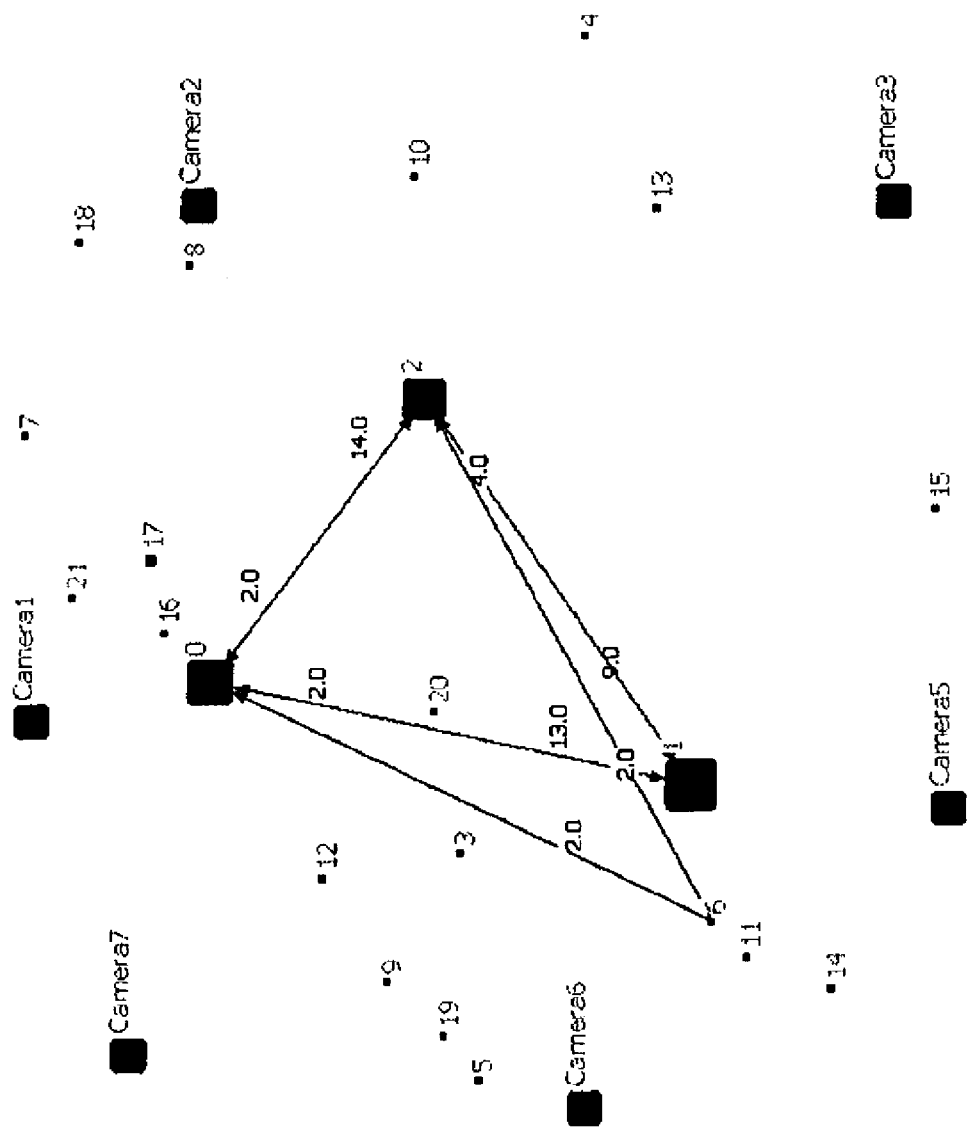
FIG. 16 is a diagram of a visualization of following events detection.
Figure 17A:
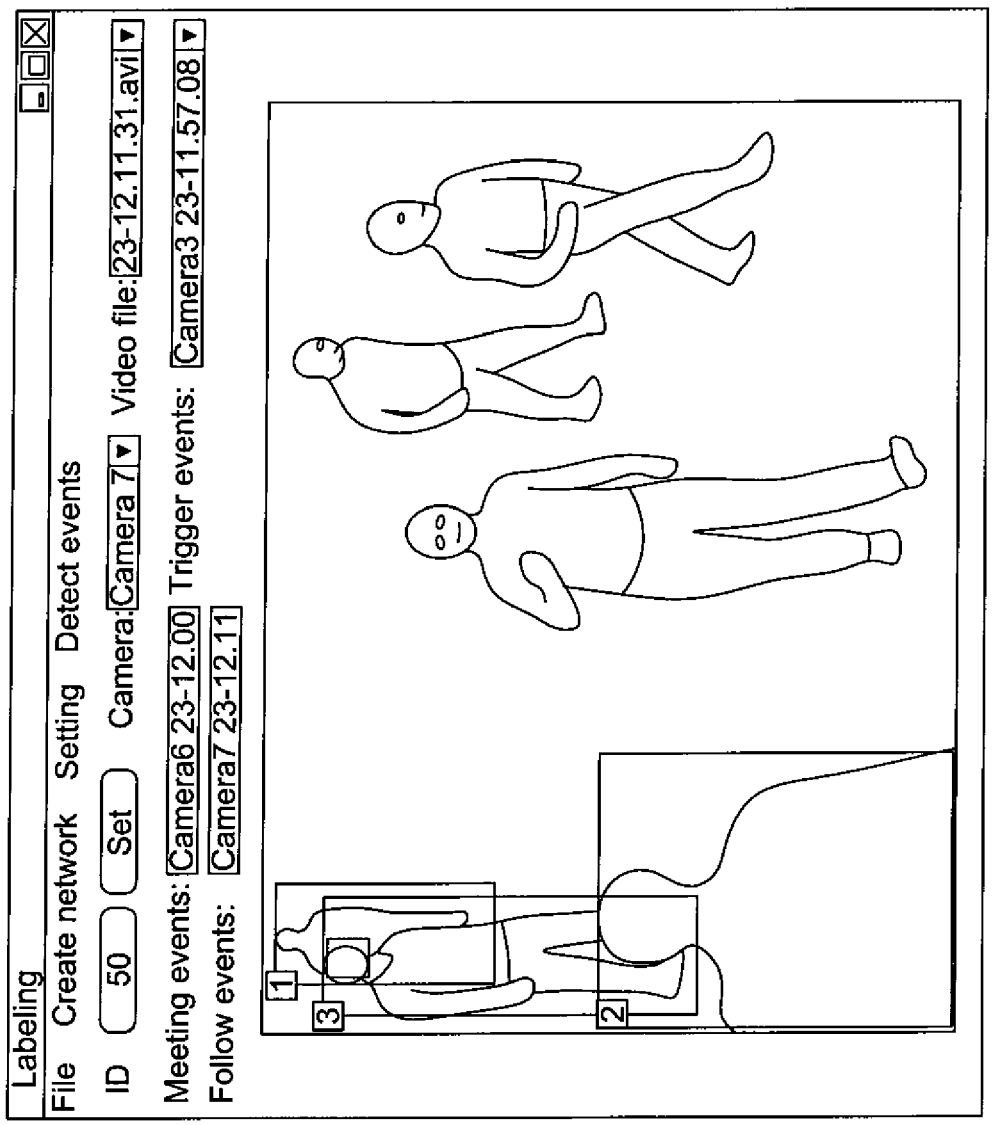
FIGS. 17a and 17b are pictures of an example following event.
Figure 17B:
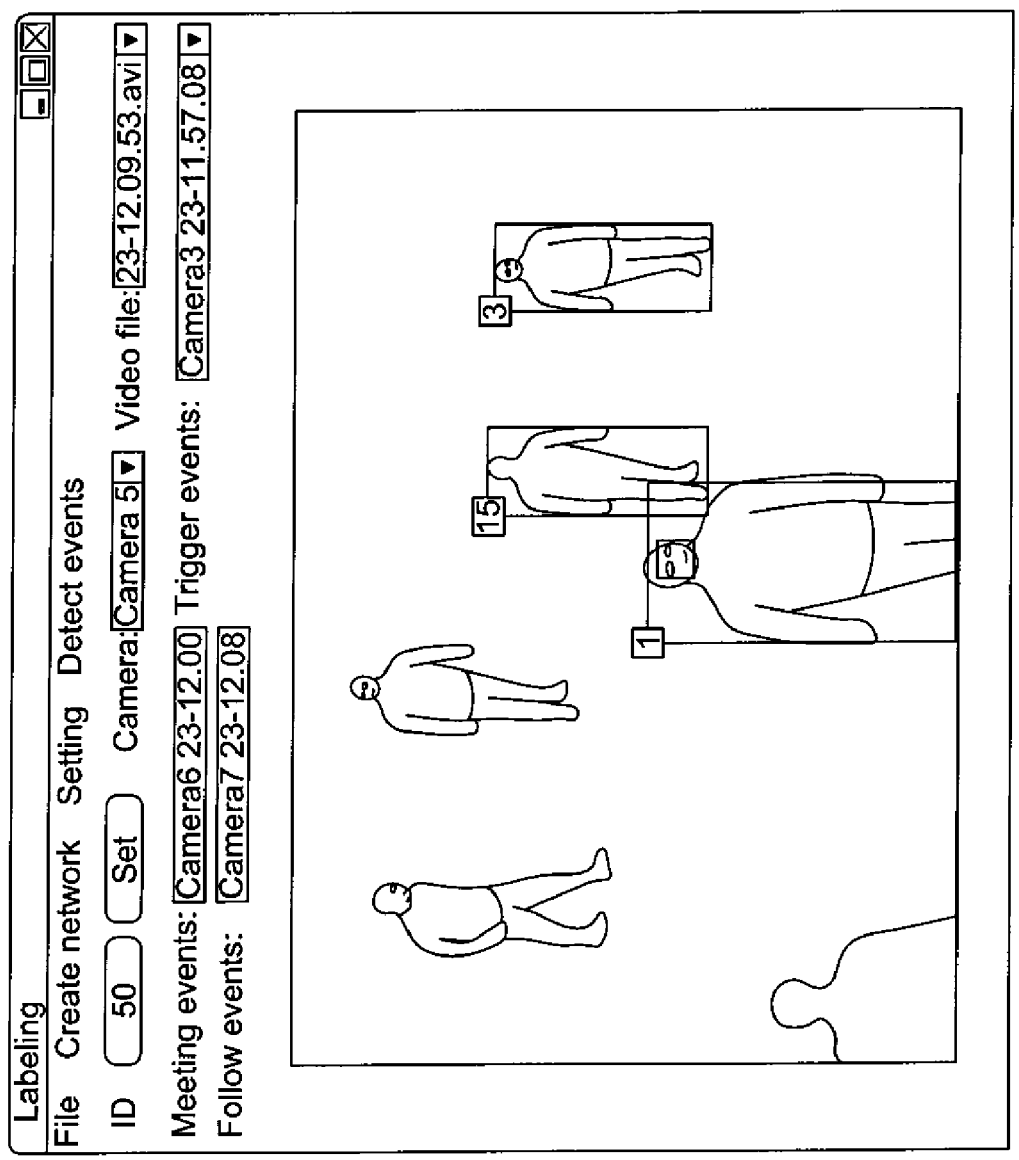

FIG. 16 shows a DSN visualization of following events detection, person ID0 followed person ID1 13 times. FIGS. 17a and 17b show an example of a following event, FIG. 17a—ID1 follows ID2 and ID2 follows ID0, FIG. 17b—ID2 follows ID0

Results for social network building for video analytics with associations may be noted. The networks created from results of video analytics with association across and within cameras are presented. First the video files were processed by face and people detection. These methods produced much more IDs than manual labeling of the data.

If one wants to compare the results to the manual labeling, one needs to associate the IDs between automatic and manual labeling.

ID 0=142, 148, 152, 153, 155, 157, 193, 228, 232, 235, 047, 048, 049, 051, 053, 084, 088, 169

ID 1=145, 192, 195, 197, 076, 089, 085, 162

ID 2=147, 151, 194, 196, 230, 233, 236, 044, 050, 052, 090, 086

In the second step, one may use the face association to split the IDs into groups. Eleven groups may be created after face association.

Selected Associations:
044—044, 050, 052, 197
047—047, 048, 152, 153, 155, 157
049—049, 051, 053, 192, 194, 228, 236
076—076, 089, 090, 145
084—084, 088
142—142, 148, 193
147—147, 151, 195, 196, 230, 233
162—162, 277, 298
166—166, 283, 304
169—169, 293, 309
232—232, 235

Figure 18A:
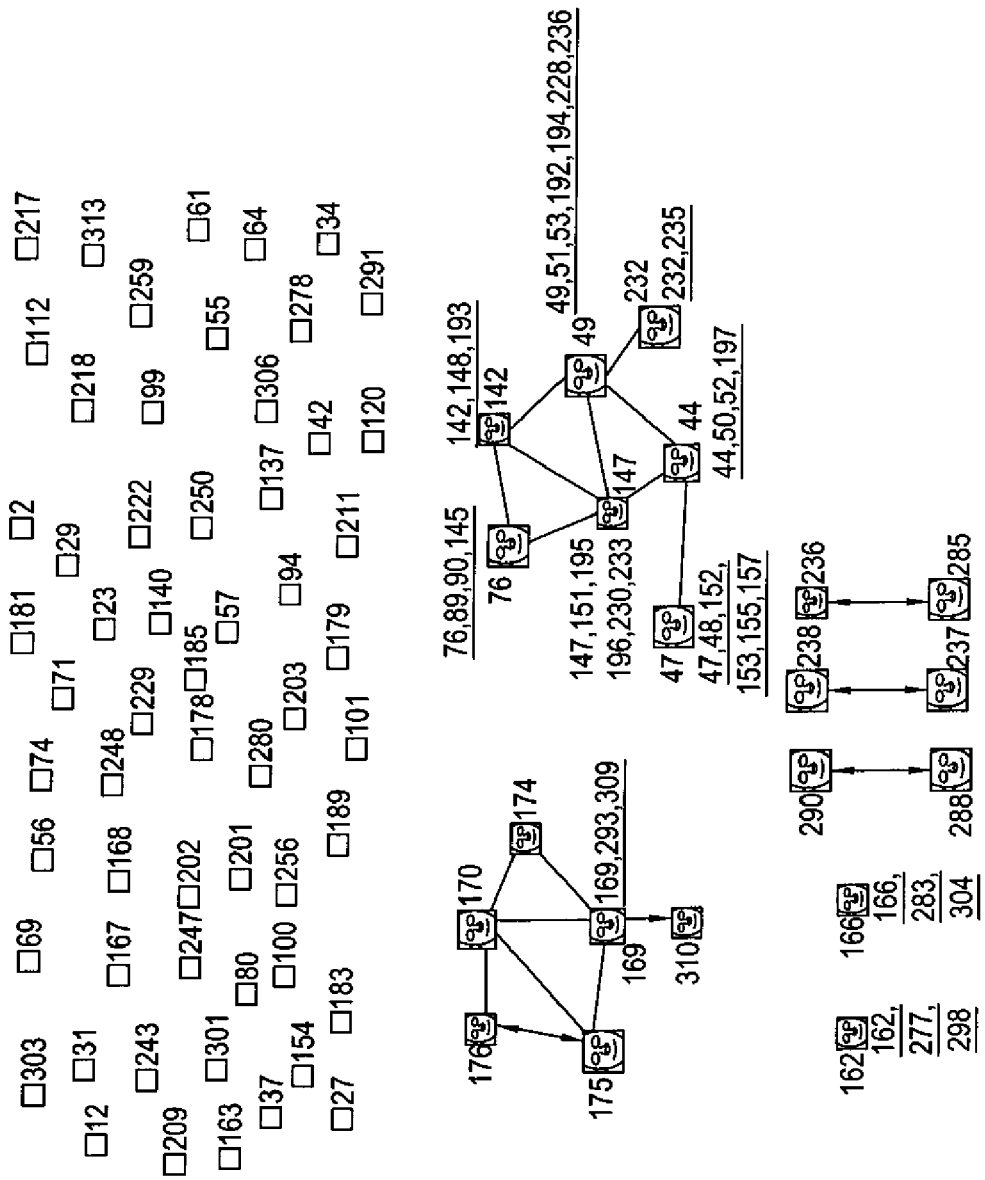
FIG. 18a is a diagram of people-people relationships made using associations.
Figure 18B:
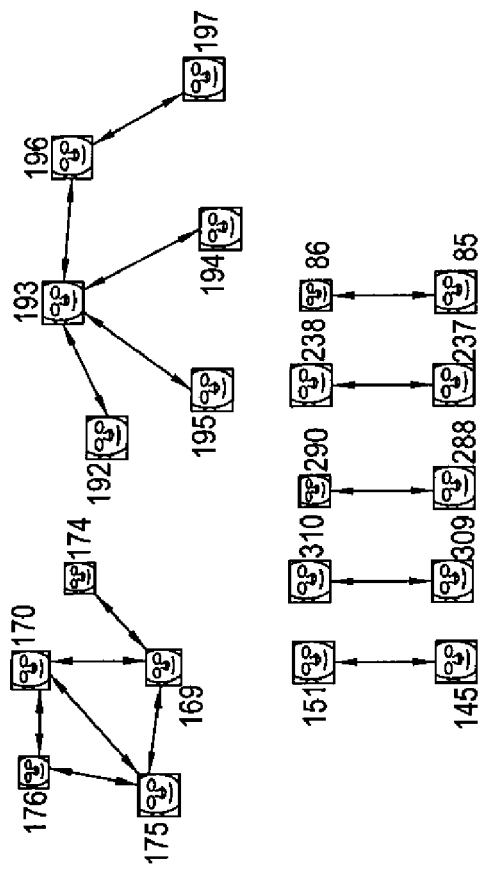
FIG. 18b is a diagram of people-people relationships made without associations.

One may compare the result of networks creation with and without associations. FIGS. 18a and 18b show the difference in attribute network people-people created with and without associations. The association joins several IDs of one person together. Several individual relationships were removed (145-151) and several relations ships are more strong (170-169). Our three actors are represented by several groups of IDs. No following atom event was detected without associations.

FIG. 18a is a diagram of people-people relationships created using associations. The bold underlined numbers represent associated IDs. FIG. 18b is a diagram of people-people relationships created without associations. Just the relationships longer than 2 seconds are presented.

The objects which correspond to three actors may have the strongest relationships. These results are similar to the results of manual labeling. There is not necessarily a detected meeting between people.

Many F events between people were detected. The results of following events detection is showed in FIG. 19. Only few following events were detected. For example for people ID169 (ID0 in manual labeling) and ID162 (ID1 in manual labeling).

The networks created from video analytics may have worse results than networks created from manual labeling. The results show that the IDs which correspond to the three actors have strongest relationships but they are not as strong as in networks created from manual labeling. The reason is that the face association is not perfect and that one may be using just face detection for detection of the objects.

Figure 19:
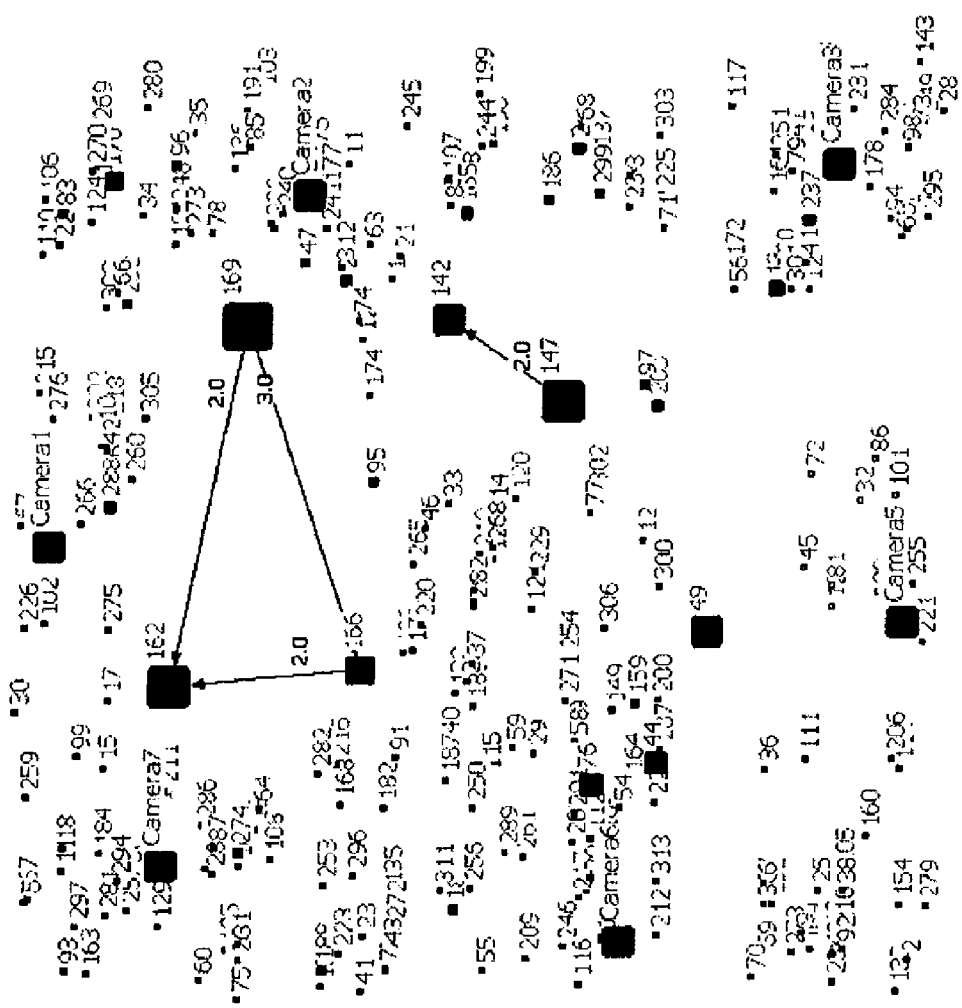
FIG. 19 is a diagram of an example of following events detection.
Figure 20A:
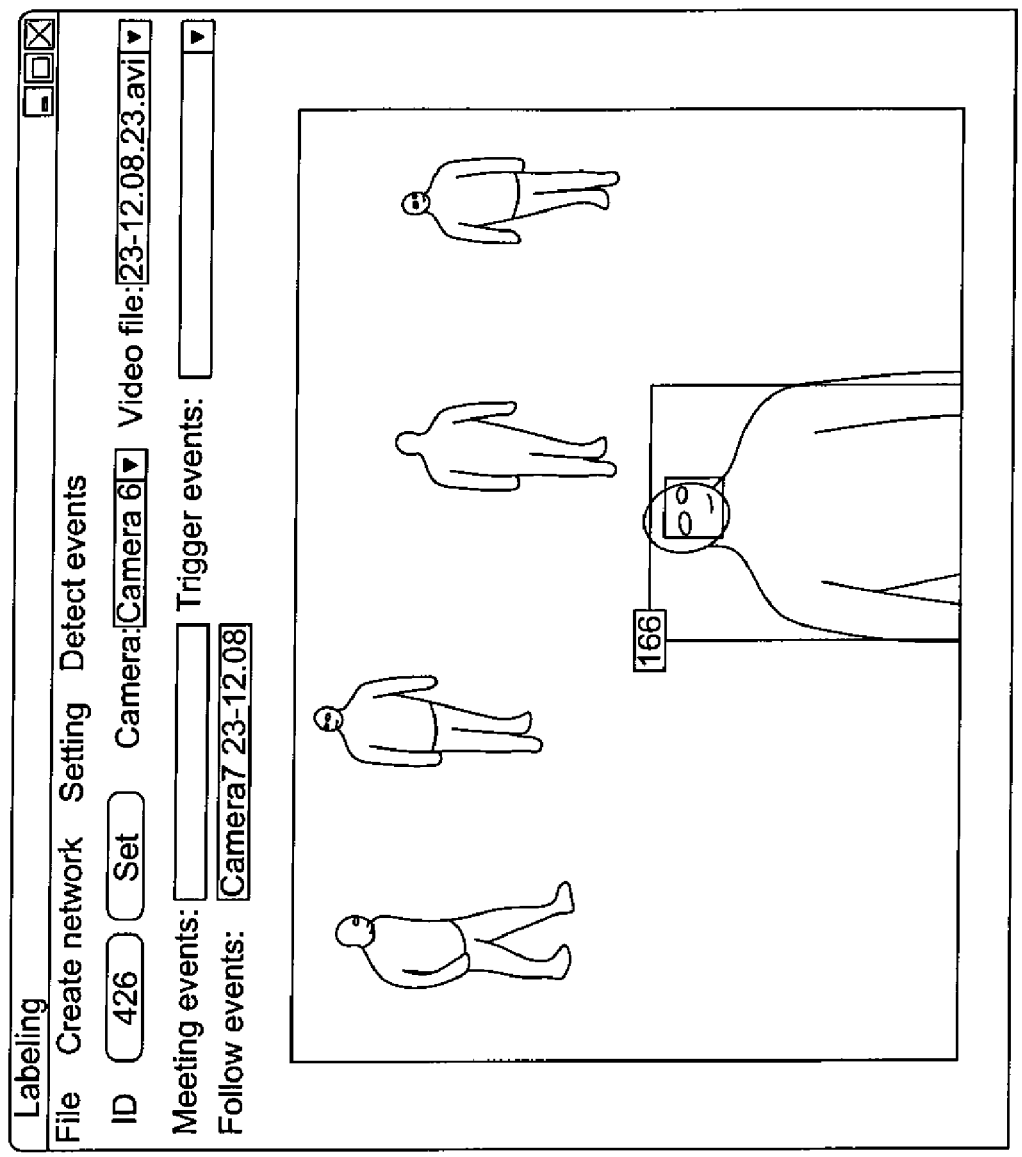
FIGS. 20a and 20b are pictures of an example following event.
Figure 20B:
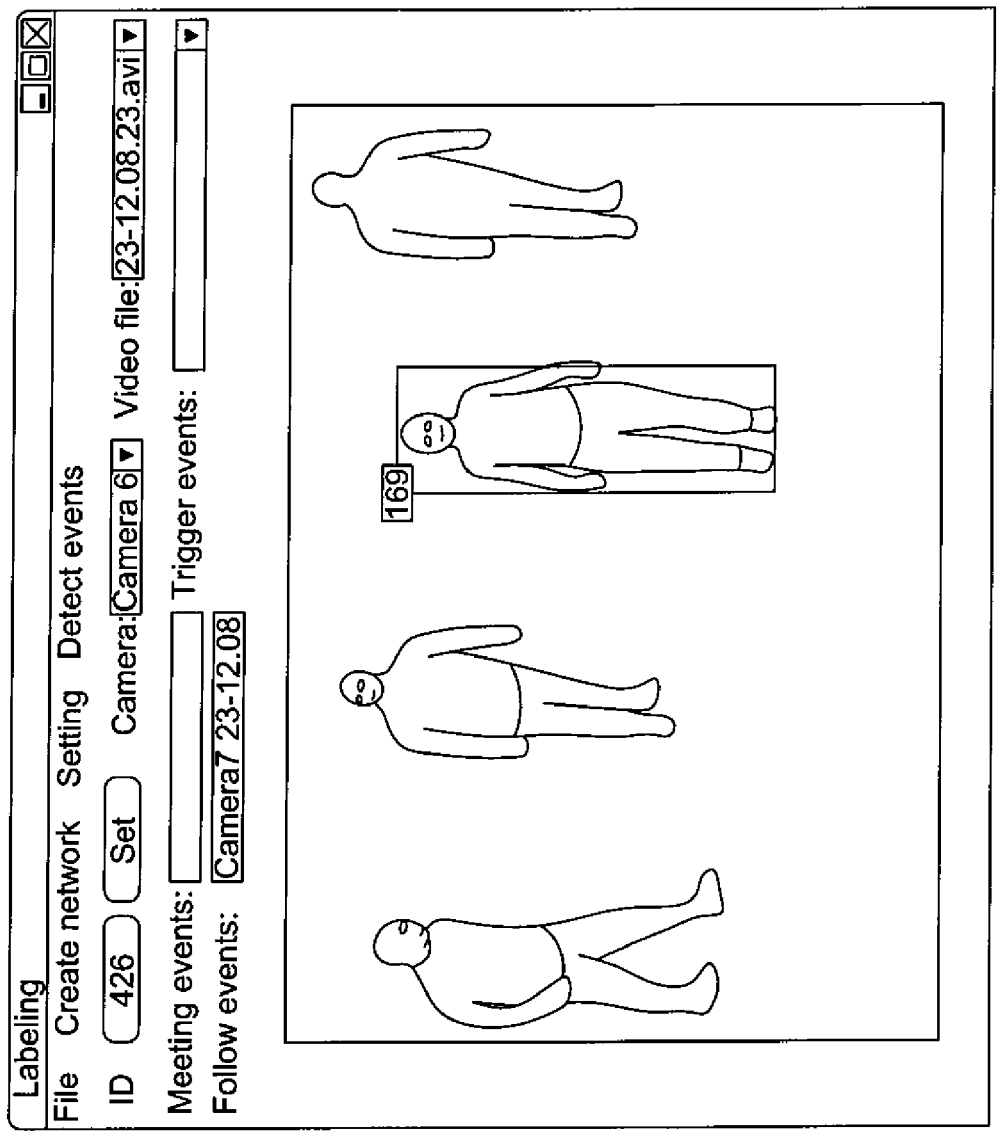
Figure 21A:
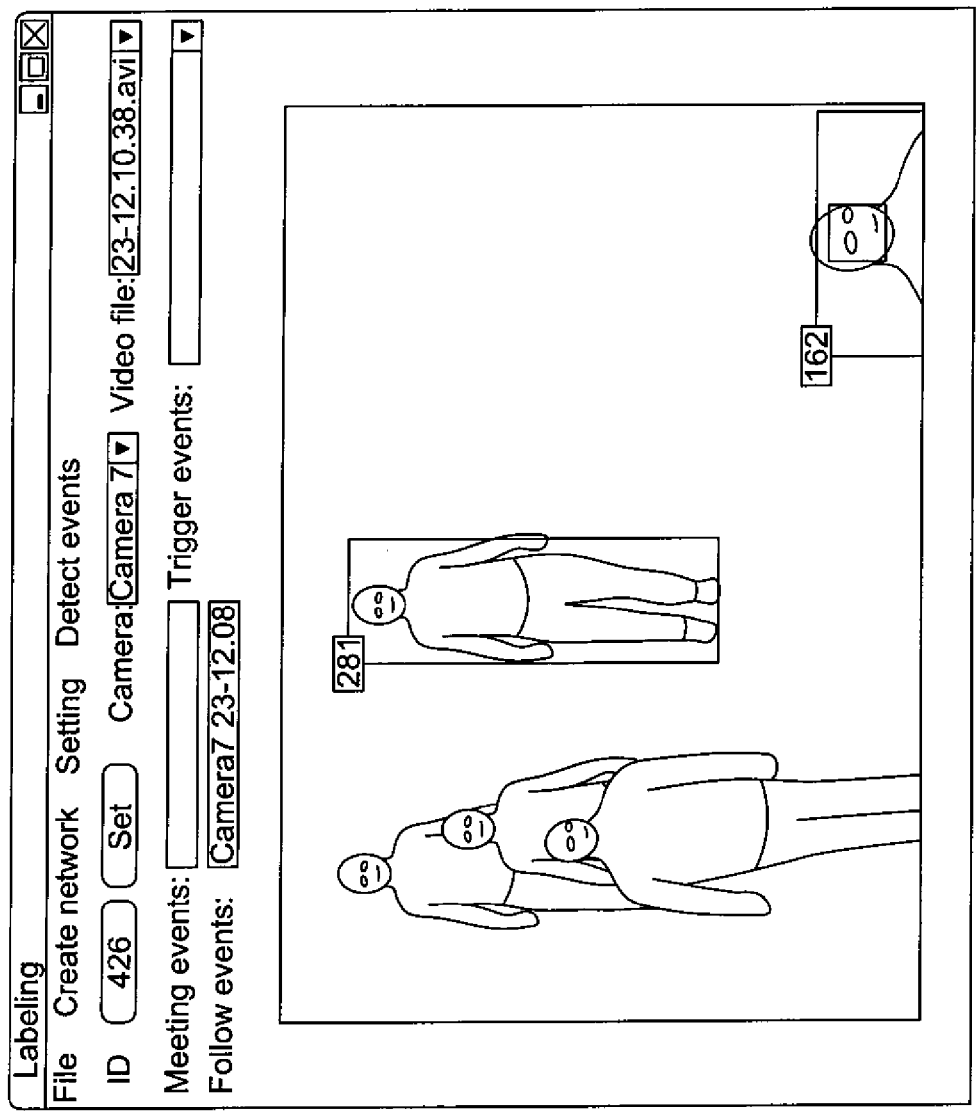
FIGS. 21a and 21b are pictures of another example following event.
Figure 21B:
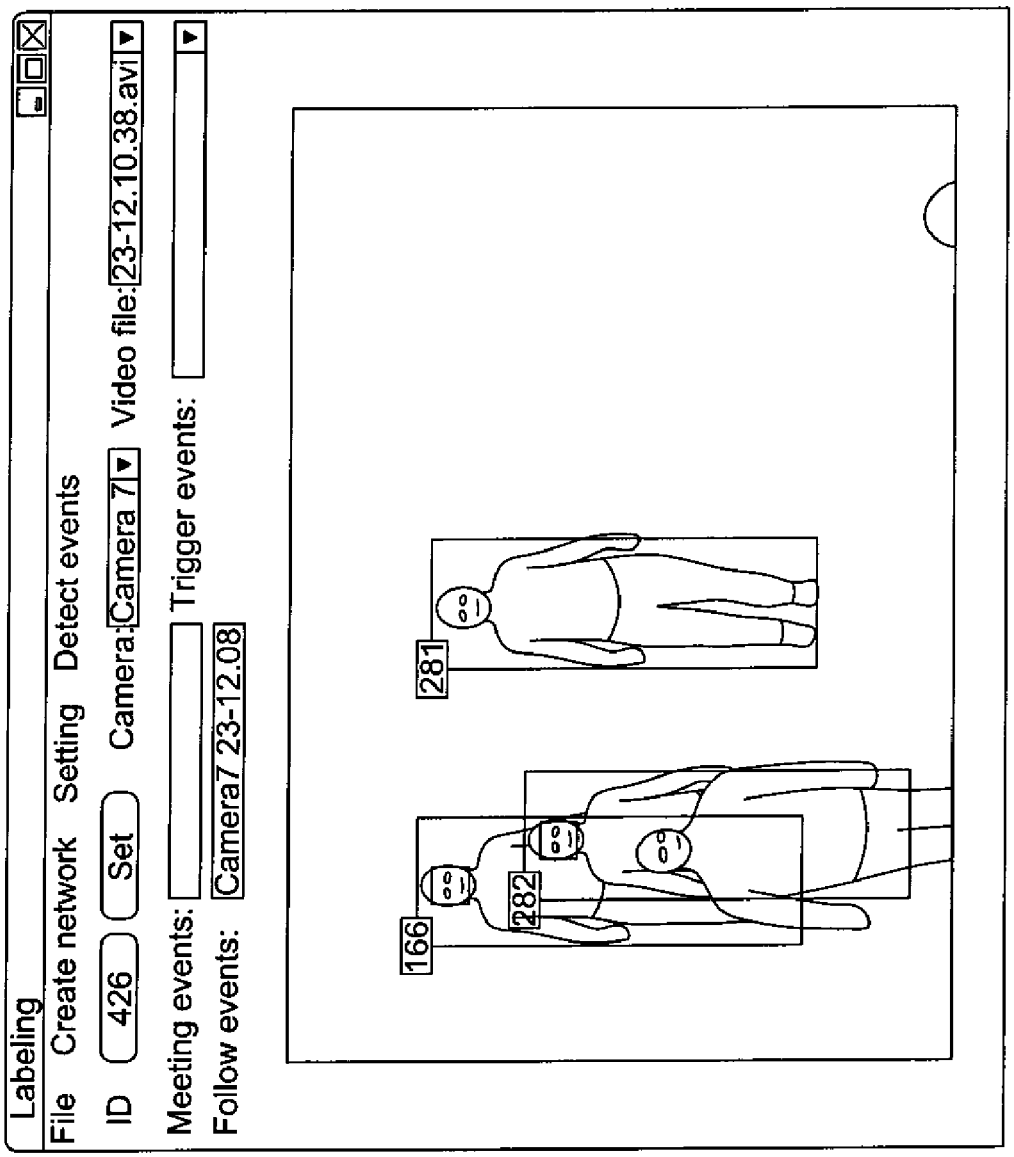

FIG. 19 shows a DSN visualization of following events detection, person ID169 follows person ID162 two times. FIGS. 20a and 20b show an example of a following event, ID169 follows ID166. FIGS. 21a and 21b show an example of a following event, ID166 follows ID162.

One may note possible results for social network building for video analytics with manual associations. Such results of network creation from a whole dataset may be noted. Prospective results noted otherwise herein were determined from subset of the whole dataset. The reduced dataset may contain just the parts of video file where three actors occur. The number of people detected in the reduced dataset may be 278+3 actors. The number of people detected in the whole dataset may be 3140.

Face association may be done manually. Only the images of the three actors and images of people related to the actors are to be associated (232 images). The networks created from whole and reduced dataset appear similar. The difference is that the network created from whole dataset may contain many more nodes. No new relationships between the people except three actors appear to be detected. Events may be detected just for the three actors.

A social network construction system may have a video analytics mechanism and an association mechanism connected to the video analytics mechanism. The video analytics mechanism may process raw data into an output providing body detection, body tracking, face detection and face tracking. The association mechanism may process data from the video analytics mechanism into an output providing face association.

There may be a processor connected to the video analytics mechanism and the association mechanism. The processor may provide low level events. The low level events may constitute a basis of a social network. The low level events may include meeting events and following events. The basis of the social network may be processed to obtain high level events.

The social network may be an attribute network having people-camera and people-time relationships. The social network may further include object association information.

In the present specification, some of the matter may be of a hypothetical or prophetic nature although stated in another manner or tense.

Although the invention has been described with respect to at least one illustrative example, many variations and modifications will become apparent to those skilled in the art upon reading the present specification. It is therefore the intention that the appended claims be interpreted as broadly as possible in view of the prior art to include all such variations and modifications.

What is claimed is:

1. A system for discovering a social group, comprising:
   a plurality of cameras for providing video data from various locations; and
   a video analytics mechanism connected to the plurality of cameras; and
   wherein:
      the video analytics mechanism is for recognizing a person of interest in video data, identifying people in temporal proximity to the person of interest from the video data, and for identifying a temporal pattern of people in temporal proximity to the person of interest;
      the temporal pattern of people in temporal proximity to the person of interest is identified with temporal sequence matching; and
      the temporal pattern reveals a social group.

2. The system of claim 1, wherein the person of interest is pre-selected for surveillance.

3. The system of claim 2, wherein:
being pre-selected is manual or automatic;
manual involves another person effecting the person of interest to be pre-selected; and
automatic involves a detection module effecting the person of interest to be pre-selected.

4. The system of claim 2, wherein temporal proximity is a time gap no longer than a specified period of time.

5. The system of claim 2, wherein people in temporal proximity to the person of interest are identified across at least some of the plurality of cameras.

6. The system of claim 2, wherein the person of interest constitutes more than one person.

7. The system of claim 2, wherein the video analytics mechanism utilizes face recognition for identifying a person of interest in video data and for identifying people in temporal proximity to the person of interest from the video data.

8. The system of claim 2, wherein the temporal sequence matching includes:
detecting two or more temporal patterns of the persons in one or more of the plurality of cameras;
comparing the two or more temporal patterns to obtain a common temporal pattern of the persons in the one or more of the plurality of cameras; and
the common temporal pattern reveals a social group.

9. The system of claim 1, wherein the temporal sequence matching includes:
identifying a temporal sequence of people in temporal proximity to the person of interest at a first time; and
identifying the temporal sequence of people in temporal proximity to the person of interest at a second time.

10. The system of claim 9, wherein the temporal sequence matching is performed with video data from a single camera, where the video data is captured at the first time and at the second time with the single camera.

11. The system of claim 1, wherein the temporal sequence matching includes:
identifying a temporal sequence of people in temporal proximity to the person of interest with a first camera; and
identifying the temporal sequence of people in temporal proximity to the person of interest with a second camera.

12. The system of claim 1, wherein the people in temporal proximity of the person of interest and the person of interest do not appear in a field of view of any of the plurality of cameras at the same time.

13. A system for discovering a social group, comprising:
a plurality of cameras for providing video data from various locations; and
a video analytics mechanism connected to the plurality of cameras; and
wherein:
the video analytics mechanism is for recognizing a person of interest in video data, identifying people in temporal proximity to the person of interest from the video data, and for identifying a temporal pattern of people in temporal proximity to the person of interest;
temporal proximity comprises:
one or more people present at a location at a first time;
a person of interest present at the location at a second time;
one or more people present at the location at a third time;
the location is a field of view of each of two or more cameras; and
the fields of view of the two or more cameras do not necessarily overlap; and
the temporal pattern reveals a social group.

14. The system of claim 13, wherein the person of interest is pre-selected for surveillance.

15. The system of claim 13, wherein:
the temporal pattern of people in temporal proximity to the person of interest is identified through temporal sequence matching; and
the temporal sequence matching includes matching a first temporal proximity with a second temporal proximity.

16. A system for discovering a social group, comprising:
a camera system for providing video data from one or more locations; and
a video analytics mechanism connected to the camera system; and
wherein:
the video analytics mechanism is for identifying one or more people in temporal proximity to a person of interest from the video data, and for identifying a temporal pattern of people in temporal proximity to the person of interest;
the temporal pattern of people in temporal proximity to the person of interest is identified through identifying a temporal sequence of people in temporal proximity to the person of interest at a first time and identifying the temporal sequence of people in temporal proximity to the person of interest at a second time;
the first time is discrete from the second time; and
the temporal pattern reveals a social group.

17. The system of claim 16, wherein the temporal pattern is determined using a single camera of the camera system.

18. The system of claim 16, wherein:
the temporal sequence of people in temporal proximity to the person of interest at the first time is identified with a first camera; and
the temporal sequence of people in temporal proximity to the person of interest at the second time is identified with a second camera.

19. The system of claim 16, wherein the person of interest is automatically pre-selected with a detection module selecting the person of interest.

20. The system of claim 16, wherein a temporal sequence is a sequence including the time at which one or more people in temporal proximity to the person of interest are present at a location with respect to the time at which the person of interest is present at the location.

* * * * *